United States Patent
Sun et al.

(10) Patent No.: US 10,700,907 B2
(45) Date of Patent: Jun. 30, 2020

(54) WAVEFORM FOR MILLIMETER WAVE NEW RADIO

(71) Applicant: QUALCOMM Incorporated, San Diego, CA (US)

(72) Inventors: Jing Sun, San Diego, CA (US); Xiao Feng Wang, San Diego, CA (US); Tao Luo, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/012,095

(22) Filed: Jun. 19, 2018

(65) Prior Publication Data

US 2019/0020522 A1    Jan. 17, 2019

Related U.S. Application Data

(60) Provisional application No. 62/531,707, filed on Jul. 12, 2017.

(51) Int. Cl.
*H04J 11/00* (2006.01)
*H04L 27/26* (2006.01)
(Continued)

(52) U.S. Cl.
CPC .......... *H04L 27/2628* (2013.01); *H04J 11/00* (2013.01); *H04L 27/2613* (2013.01);
(Continued)

(58) Field of Classification Search
CPC ................................................. H04L 27/2628
See application file for complete search history.

(56) References Cited

U.S. PATENT DOCUMENTS

2002/0172213 A1* 11/2002 Laroia .................... H04L 5/023
370/430
2005/0249297 A1* 11/2005 Kratochwil .......... H04L 5/0007
375/260
(Continued)

OTHER PUBLICATIONS

Ericsson: "On UL PTRS Design", 3GPP Draft; R1-1711048, 3rd Generation Partnership Project (3GPP), Mobile Competence Centre; 650, Route Des Lucioles; F-06921 Sophia-Antipolis Cedex; France, vol. RAN WG1 No. Qingdao, China; Jun. 27, 2017-Jun. 30, 2017, Jun. 26, 2017, XP051300248, Retrieved from the Internet: URL:http://www.3gpp.org/ftp/Meetings_3GPP_SYNC/RAN1/Docs/ [retrieved on Jun. 26, 2017], 6 pages.
(Continued)

*Primary Examiner* — Gerald A Smarth
(74) *Attorney, Agent, or Firm* — Patterson + Sheridan, L.L.P. Qualcomm

(57) ABSTRACT

Certain aspects of the present disclosure relate to communication systems, and more particularly, to single-carrier waveform generation for transmission. An exemplary method generally includes concatenating a first sequence of data samples with samples of a known sequence to generate a first series of samples, performing a discrete Fourier transform (DFT) on the first series of samples to generate a first series of frequency-domain samples, mapping the first series of frequency-domain samples and first zero values to first tones of a system bandwidth, performing an inverse discrete Fourier transform (IDFT) on the mapped first series of frequency-domain samples and the mapped first zero values to generate first time-domain samples of a first orthogonal frequency domain multiplexing (OFDM) symbol, and transmitting the first OFDM symbol as a single-carrier waveform in a first period.

16 Claims, 18 Drawing Sheets

(51) Int. Cl.
*H04L 5/00* (2006.01)
*H04W 72/04* (2009.01)

(52) U.S. Cl.
CPC ... *H04L 27/2636* (2013.01); *H04J 2011/0006* (2013.01); *H04J 2011/0009* (2013.01); *H04L 5/0048* (2013.01); *H04L 5/0053* (2013.01); *H04L 27/262* (2013.01); *H04W 72/0406* (2013.01)

(56) References Cited

U.S. PATENT DOCUMENTS

| | | | |
|---|---|---|---|
| 2011/0096854 A1* | 4/2011 | Fanson | H04L 27/2634 375/260 |
| 2014/0301431 A1* | 10/2014 | Nair | H04L 5/0017 375/146 |
| 2016/0100408 A1* | 4/2016 | Hedayat | H04L 65/4076 370/329 |
| 2016/0218905 A1 | 7/2016 | Roh et al. | |

OTHER PUBLICATIONS

Huawei et al., "PTRS for DFT-s-OFDM", 3GPP Draft; R1-1709940, 3rd Generation Partnership Project (3GPP), Mobile Competence Centre; 650, Route Des Lucioles; F-06921 Sophia-Antipolis Cedex; France, vol. RAN WG1, No, Qingdao, China; Jun. 27, 2017-Jun. 30, 2017 Jun. 26, 2017, XP051299165, Retrieved from the Internet: URL:http://www.3gpp.org/ftp/Meetings_3GPP_SYNC/RAN1/ Docs/ [retrieved on Jun. 26, 2017], 6 pages.

International Search Report and Written Opinion—PCT/US2018/ 038577—ISA/EPO—dated Sep. 11, 2018.

QUALCOMM: "Channelization of 1-symbol short PUCCH with More than 2 Bits Payload", 3GPP Draft; R1-1711189 Channelization of 1-Symbol Short PUCCH with More than 2 Bits Payload, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017 Jun. 26, 2017, XP051300388, Retrieved from the Internet: URL:http://www.3gpp.org/ftp/Meetings_3GPP_SYNC/ RAN1/ Docs/ [retrieved on Jun. 26, 2017], 10 pages.

* cited by examiner

WAVEFORM FOR MILLIMETER WAVE NEW RADIO

CROSS-REFERENCE TO RELATED APPLICATIONS

The present Application for Patent claims priority to U.S. Provisional Application No. 62/531,707, filed Jul. 12, 2017, which is assigned to the assignee hereof and hereby expressly incorporated by reference herein in its entirety.

FIELD

The present disclosure relates generally to communication systems, and more particularly, to a single-carrier waveform generated by concatenating data samples with samples of a known sequence to generate a series of samples prior to performing a discrete Fourier transform (DFT) on the series of samples to generate a series of frequency-domain samples, mapping the frequency-domain samples and zero values to tones of a bandwidth, performing an inverse discrete Fourier transform (IDFT) on the mapped frequency-domain samples and mapped zero values to generate symbols, and transmitting the symbols as a single-carrier waveform using the bandwidth in communications systems operating according to new radio (NR) technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to single-carrier waveforms. Samples of a known sequence may be concatenated with data samples before transformation into a single-carrier waveform for transmission. A receiver receiving the waveform may treat symbols generated from the known sequence as a guard interval between data transmissions and as a phase tracking reference signal to determine changes in phase between transmissions.

Certain aspects provide a method for wireless communication. The method generally includes concatenating a first sequence of data samples with samples of a known sequence to generate a first series of samples, performing a discrete Fourier transform (DFT) on the first series of samples to generate a first series of frequency-domain samples, mapping the first series of frequency-domain samples and first zero values to first tones of a system bandwidth, performing an inverse discrete Fourier transform (IDFT) on the mapped first series of frequency-domain samples and the mapped first zero values to generate first time-domain samples of a first orthogonal frequency domain multiplexing (OFDM) symbol, and transmitting the first OFDM symbol as a single-carrier waveform in a first period.

Certain aspects provide a method for wireless communication. The method generally includes receiving a first orthogonal frequency domain multiplexing (OFDM) symbol as a single-carrier waveform in a first period, performing a discrete Fourier transform (DFT) on first time-domain samples of the first OFDM symbol to generate first frequency-domain samples, performing an inverse discrete Fourier transform (IDFT) on the first frequency-domain samples to generate a first series of data samples and first samples of a known sequence, and processing the first series of data samples to determine data.

Certain aspects provide an apparatus for wireless communication. The apparatus generally includes a processor configured to concatenate a first sequence of data samples with samples of a known sequence to generate a first series of samples, to perform a discrete Fourier transform (DFT) on the first series of samples to generate a first series of frequency-domain samples, to map the first series of frequency-domain samples and first zero values to first tones of a system bandwidth, to perform an inverse discrete Fourier transform (IDFT) on the mapped first series of frequency-domain samples and the mapped first zero values to generate first time-domain samples of a first orthogonal frequency domain multiplexing (OFDM) symbol, and to transmit the first OFDM symbol as a single-carrier waveform in a first period, and a memory coupled with the processor.

Certain aspects provide an apparatus for wireless communication. The apparatus generally includes a processor configured to receive a first orthogonal frequency domain multiplexing (OFDM) symbol as a single-carrier waveform in a first period, to perform a discrete Fourier transform (DFT) on first time-domain samples of the first OFDM symbol to generate first frequency-domain samples, to perform an inverse discrete Fourier transform (IDFT) on the first frequency-domain samples to generate a first series of data samples and first samples of a known sequence, and to process the first series of data samples to determine data, and a memory coupled with the processor.

Certain aspects provide an apparatus for wireless communication. The apparatus generally includes means for concatenating a first sequence of data samples with samples of a known sequence to generate a first series of samples, means for performing a discrete Fourier transform (DFT) on the first series of samples to generate a first series of frequency-domain samples, means for mapping the first series of frequency-domain samples and first zero values to first tones of a system bandwidth, means for performing an inverse discrete Fourier transform (IDFT) on the mapped first series of frequency-domain samples and the mapped first zero values to generate first time-domain samples of a first orthogonal frequency domain multiplexing (OFDM) symbol, and means for transmitting the first OFDM symbol as a single-carrier waveform in a first period.

Certain aspects provide an apparatus for wireless communication. The apparatus generally includes means for receiving a first orthogonal frequency domain multiplexing (OFDM) symbol as a single-carrier waveform in a first period, means for performing a discrete Fourier transform (DFT) on first time-domain samples of the first OFDM symbol to generate first frequency-domain samples, means for performing an inverse discrete Fourier transform (IDFT) on the first frequency-domain samples to generate a first series of data samples and first samples of a known sequence, and means for processing the first series of data samples to determine data.

Certain aspects provide a computer-readable medium for wireless communication. The computer-readable medium includes instructions that, when executed by a processing system, cause the processing system to perform operations generally including concatenating a first sequence of data samples with samples of a known sequence to generate a first series of samples, performing a discrete Fourier transform (DFT) on the first series of samples to generate a first series of frequency-domain samples, mapping the first series of frequency-domain samples and first zero values to first tones of a system bandwidth, performing an inverse discrete Fourier transform (IDFT) on the mapped first series of frequency-domain samples and the mapped first zero values to generate first time-domain samples of a first orthogonal frequency domain multiplexing (OFDM) symbol, and transmitting the first OFDM symbol as a single-carrier waveform in a first period.

Certain aspects provide a computer-readable medium for wireless communication. The computer-readable medium includes instructions that, when executed by a processing system, cause the processing system to perform operations generally including receiving a first orthogonal frequency domain multiplexing (OFDM) symbol as a single-carrier waveform in a first period, preforming a discrete Fourier transform (DFT) on first time-domain samples of the first OFDM symbol to generate first frequency-domain samples, performing an inverse discrete Fourier transform (IDFT) on the first frequency-domain samples to generate a first series of data samples and first samples of a known sequence, and processing the first series of data samples to determine data.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
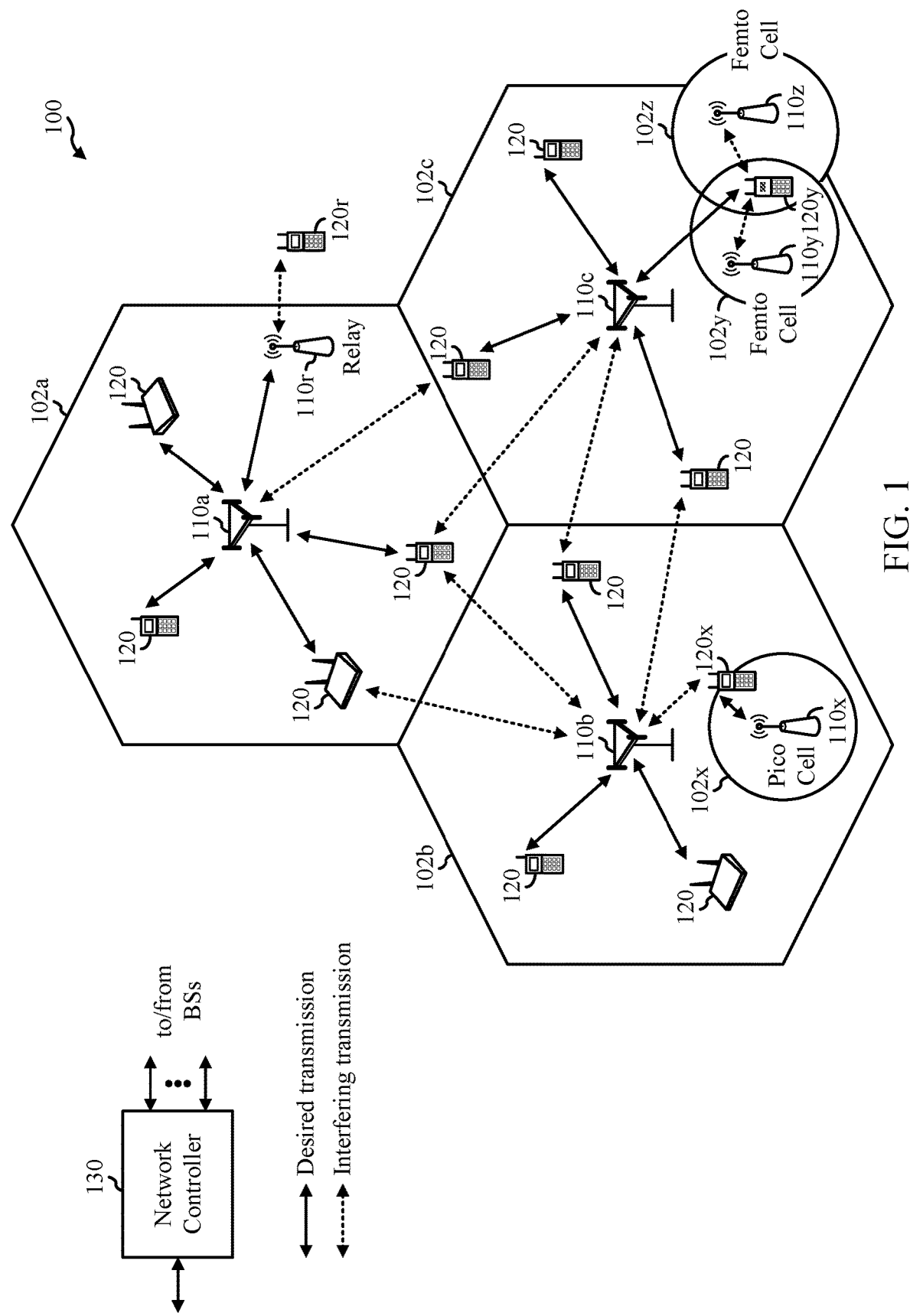
FIG. 1 is a block diagram conceptually illustrating an example telecommunications system, in accordance with certain aspects of the present disclosure.

In communications systems operating according to millimeter-wave (mmW) new radio (NR) (e.g., 5G) standards, single-carrier waveforms, in addition to OFDMA waveforms, may be used by devices to extend the downlink (DL) link budget. That is, use of a single-carrier waveform may improve power levels of received downlink signals at receiving devices. The single-carrier waveform may allow a lower peak-to-average-power ratio (PAPR) of the signal, which may allow a power amplifier (PA) of a transmit chain to use a higher transmit power level. PreDFT (i.e., prior to a discrete Fourier transform) guard-interval insertion DFT single-carrier frequency division multiplexing (PreDFT-GI-DFT-s-FDM) is one type of single-carrier waveform that may be used for downlink signals.

NR communication systems may support various wireless communication services, such as enhanced mobile broadband (eMBB) techniques targeting wide bandwidth (e.g. 80 MHz and wider) communications, millimeter wave (mmW) techniques targeting high carrier frequency (e.g., 27 GHz and higher) communications, massive machine-type communications (mMTC) techniques targeting non-backward compatible machine-type communications (MTC), and/or mission critical techniques targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to transmitting single-carrier waveforms, such as PreDFT-GI-DFT-s-FDM.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for enabling connectivity sessions and internet protocol (IP) establishment, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz).

Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
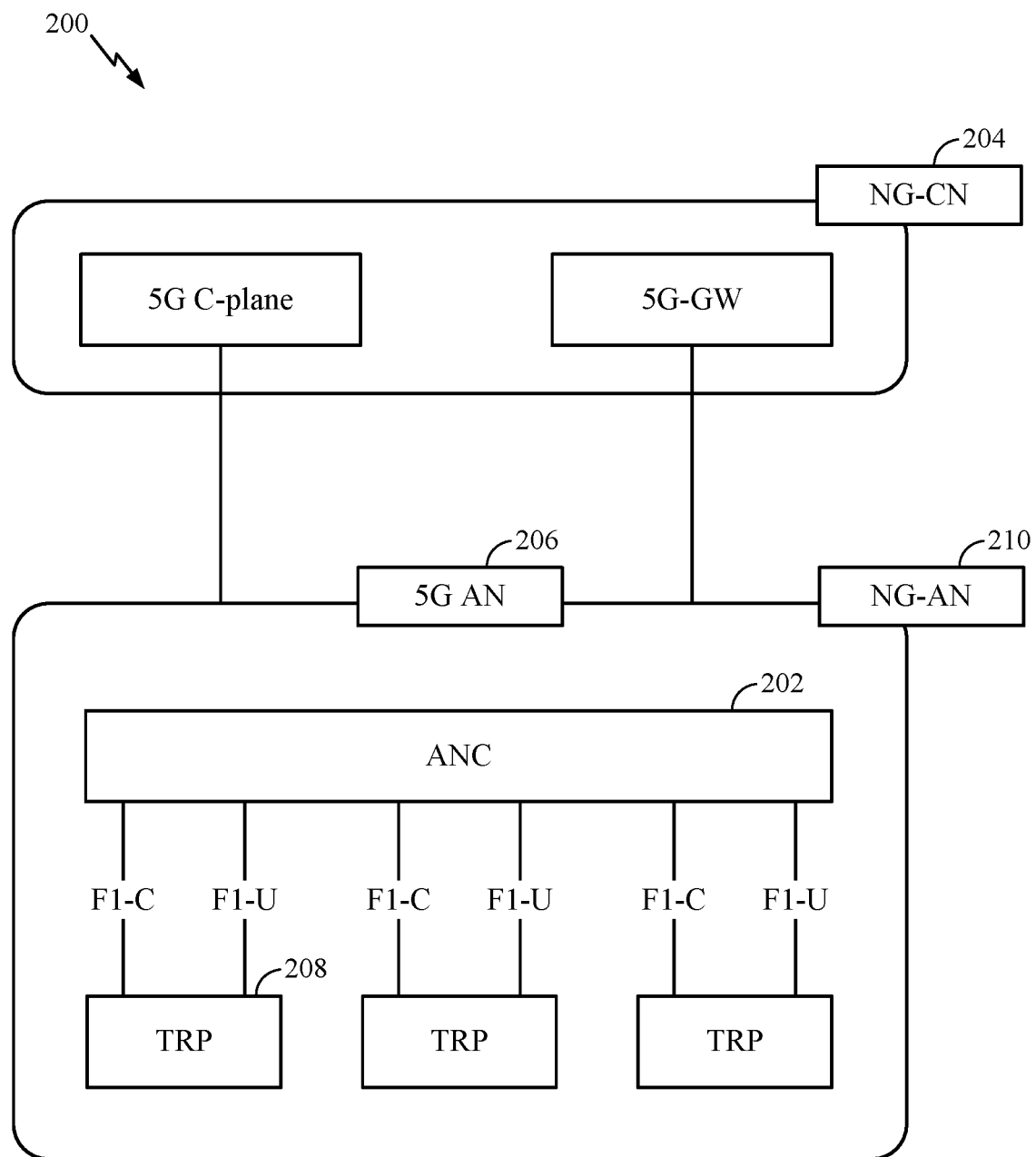
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed and/or present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
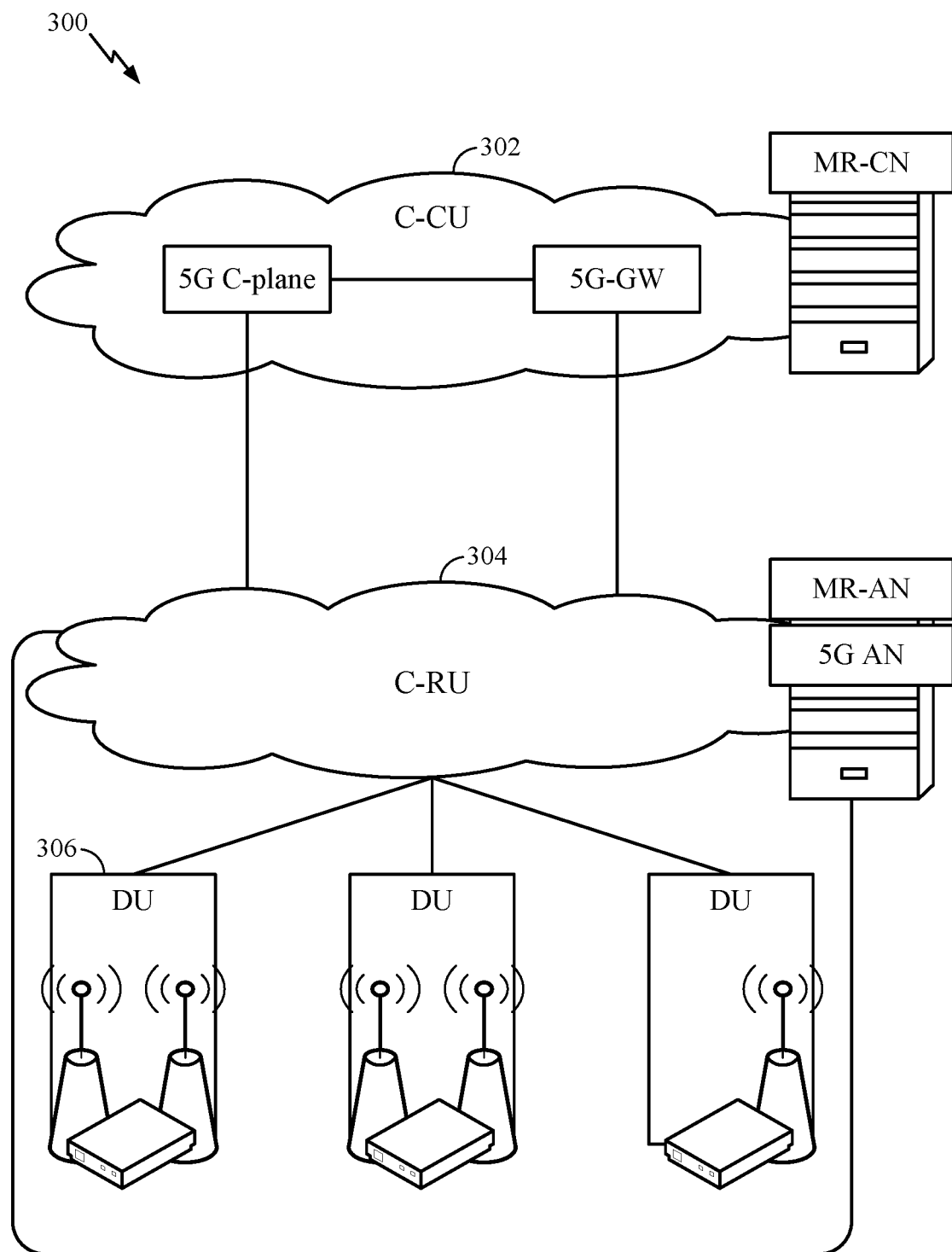
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
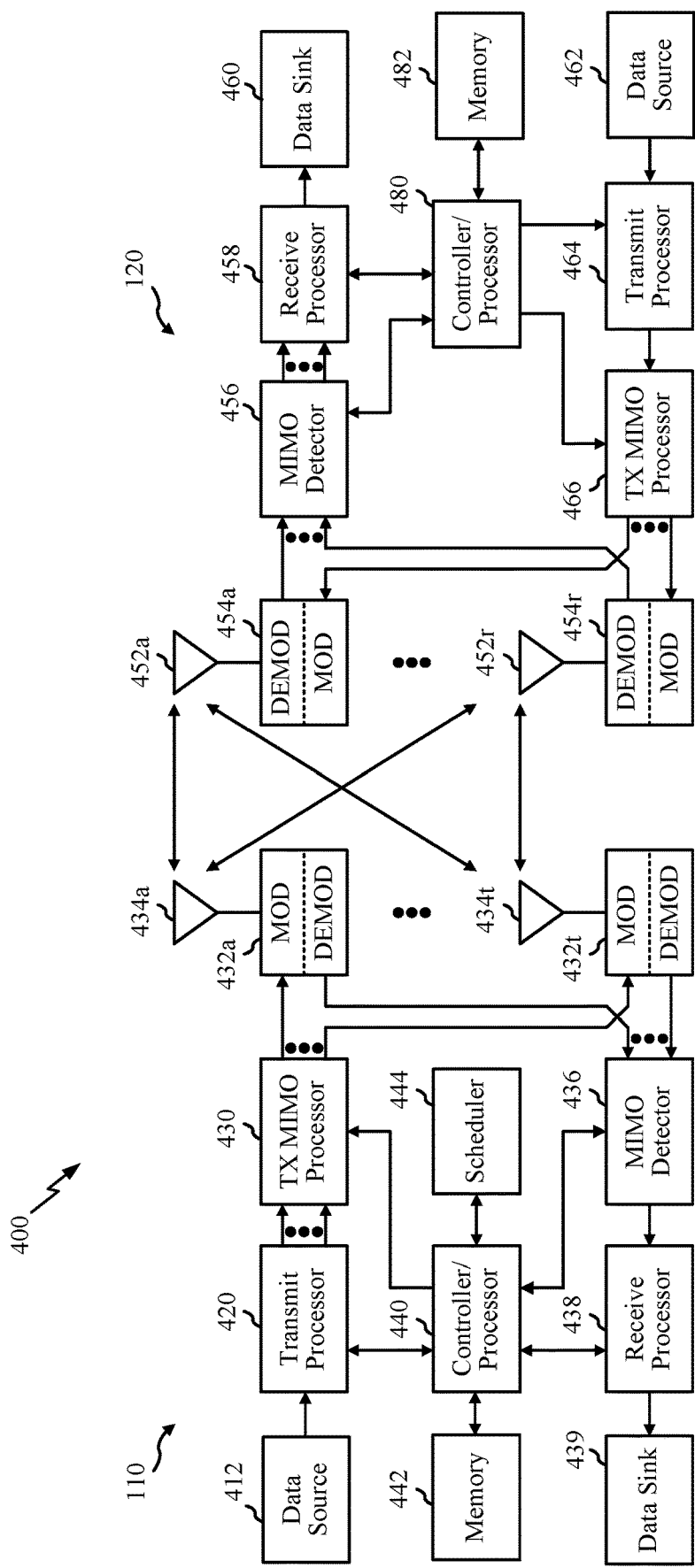
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 13.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the BS 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 13, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
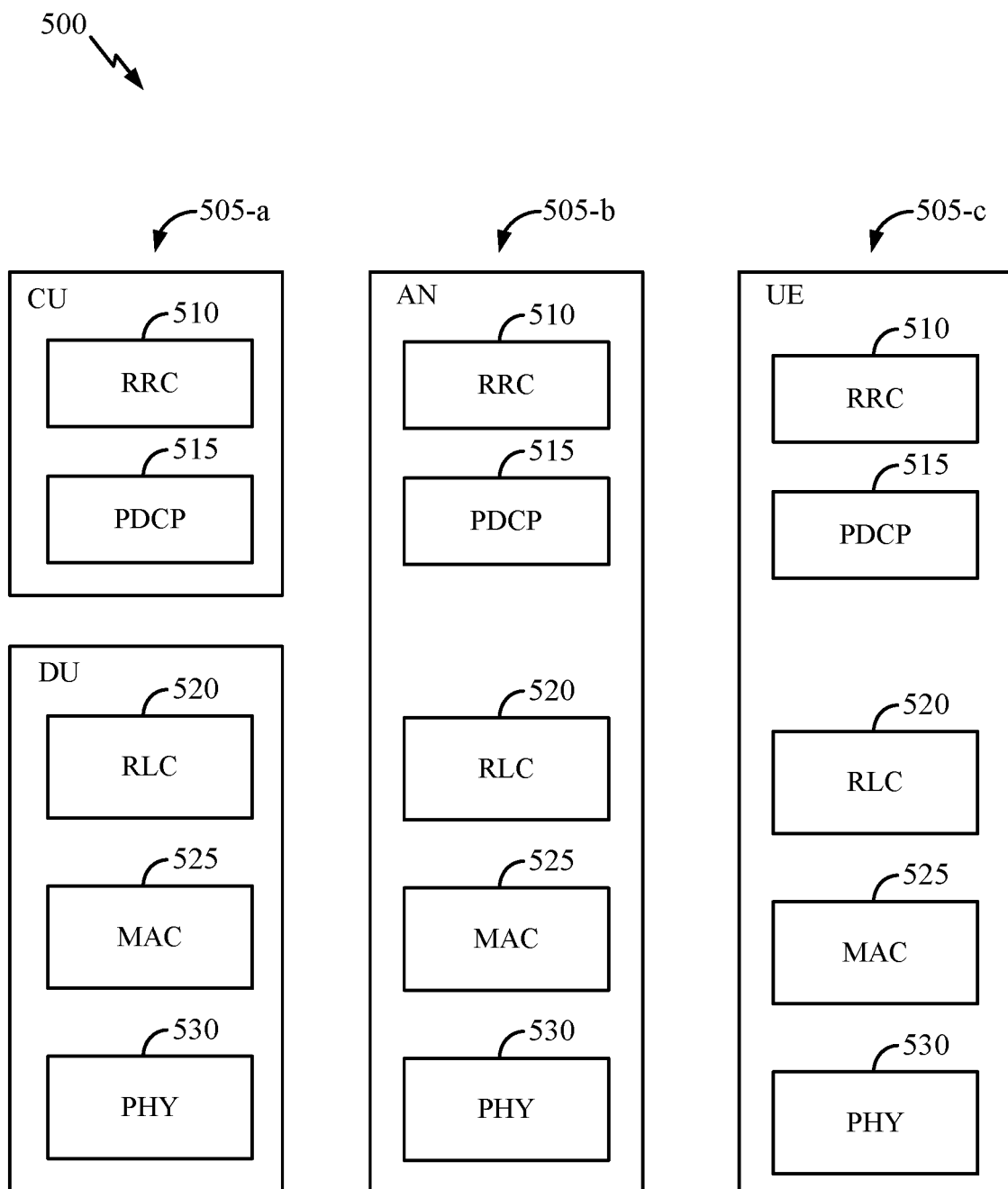
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack 505-*c* (e.g., the RRC layer 510, the PDCP layer 515, the RLC layer 520, the MAC layer 525, and the PHY layer 530).

Figure 6:
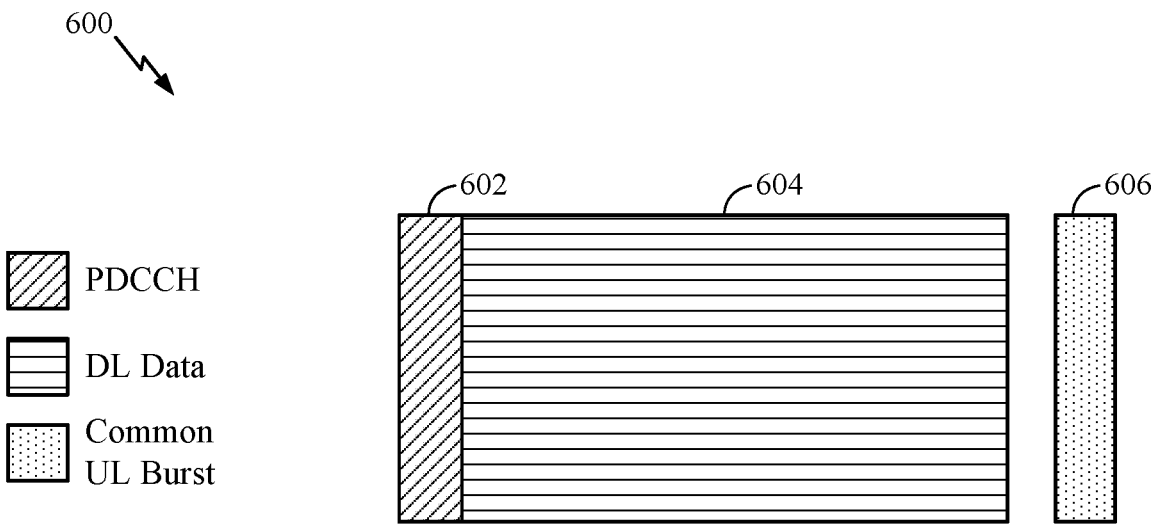
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
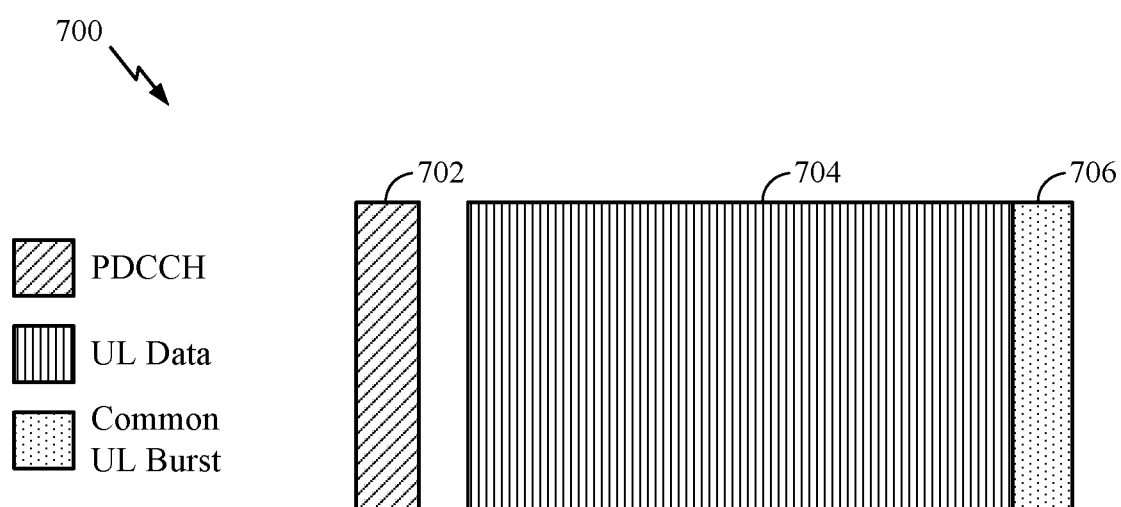
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Single-carrier waveforms have been implemented in communications systems operating according to other standards. For example, single-carrier quadrature amplitude modulation (SC-QAM) with a guard interval (GI) is implemented as a waveform used in IEEE 802.11ad communications systems. A second example is that discrete Fourier transform (DFT) single-carrier frequency division multiplexing (DFT-s-FDM) is the waveform used for uplink (UL) transmissions in LTE communications systems. Zero tail discrete Fourier transform single-carrier frequency division multiplexing (ZT-DFT-s-FDM) has been proposed for use in new radio standards, but not adopted at this time. Guard interval discrete Fourier transform single-carrier frequency division multiplexing (GI-DFT-s-FDM) is similar to a modified version of ZT-DFT-s-FDM that has been studied for use in wireless communication systems.

It is desirable for a waveform used in millimeter wave (mmW) communications is to have a low peak to average power ratio (PAPR), as this may enable a power amplifier of a transmitter to perform better (e.g., to consume less power when transmitting or to cause less noise in the signal) than a higher PAPR.

It may also be desirable for a waveform used in mmW communications to supply a reference for tracking phase of transmissions from the transmitter, such as by having a phase tracking reference signal (PTRS) inserted in the waveform.

Figure 8A:
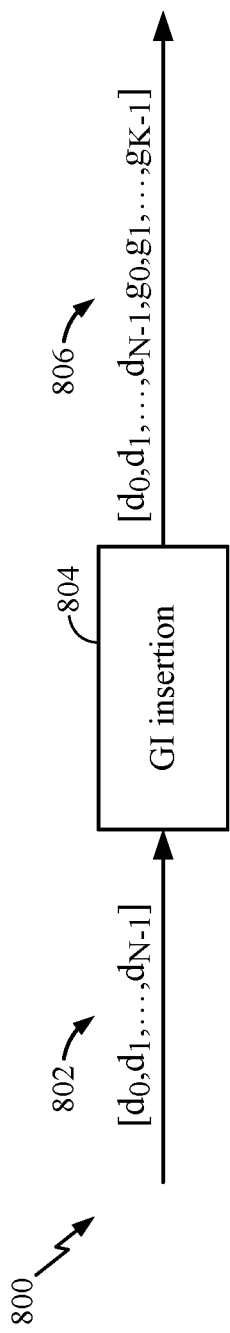
FIGS. 8A & 8B illustrate exemplary timelines for generation of a single-carrier quadrature amplitude modulation (SC-QAM) waveform, in accordance with certain aspects of the present disclosure.
Figure 8B:
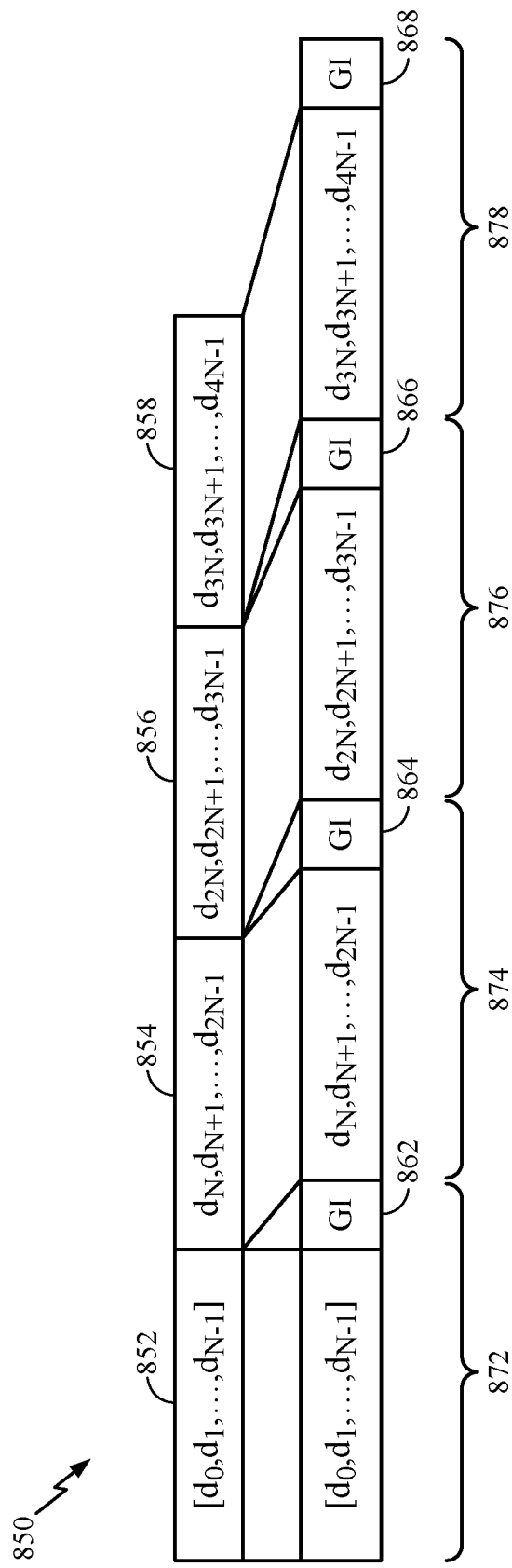

FIGS. 8A & 8B illustrate exemplary timelines 800 and 850 for generation of an SC-QAM waveform. The SC-QAM waveform may be generated for transmission by a transmitter of a BS or UE, such as BS 110a or UE 120, shown in FIG. 1. At 802, a sequence of N data samples $d_0, d_1, \ldots d_{N-1}$ are obtained by the transmitter. At 804, the transmitter concatenates the sequence of data samples with K samples of a guard interval (GI) sequence to form a combined sequence for transmission at 806. The timeline 850 shows generation of multiple waveforms for transmission. As illustrated, the transmitter obtains 4N data samples that the transmitter divides into four sequences 852, 854, 856, and 858, with each sequence comprising N data samples. The transmitter concatenates each sequence of N data samples with K samples of a GI sequence 862, 864, 866, and 868 to form a series of transmissions 872, 874, 876, and 878.

A transmitter configured to transmit SC-QAM transmissions, such as those described in FIGS. 8A and 8B, may have a lower PAPR than some other transmitters. The GI included with each transmission can be used for frequency domain equalization at a receiver, in that the GI should be identical from transmission to transmission. Performing frequency domain equalization may be less computationally intensive for a receiver than performing time domain equalization. For the transmitter, a fast Fourier transform (FFT) performed during a transmission is of a size sufficient to cover one data segment and the GI that follows the data segment, e.g., the size of a FFT performed by a transmitter transmitting the SC-QAM waveform described with respect to FIG. 8A is N+K. In addition, a previous GI may be used as a cyclic prefix (CP) for a current transmission. The GI may also be used as a PTRS or other type of reference signal for the signals, by comparing the GI of two symbols after equalization to compute the phase difference between the two symbols.

Figure 9A:
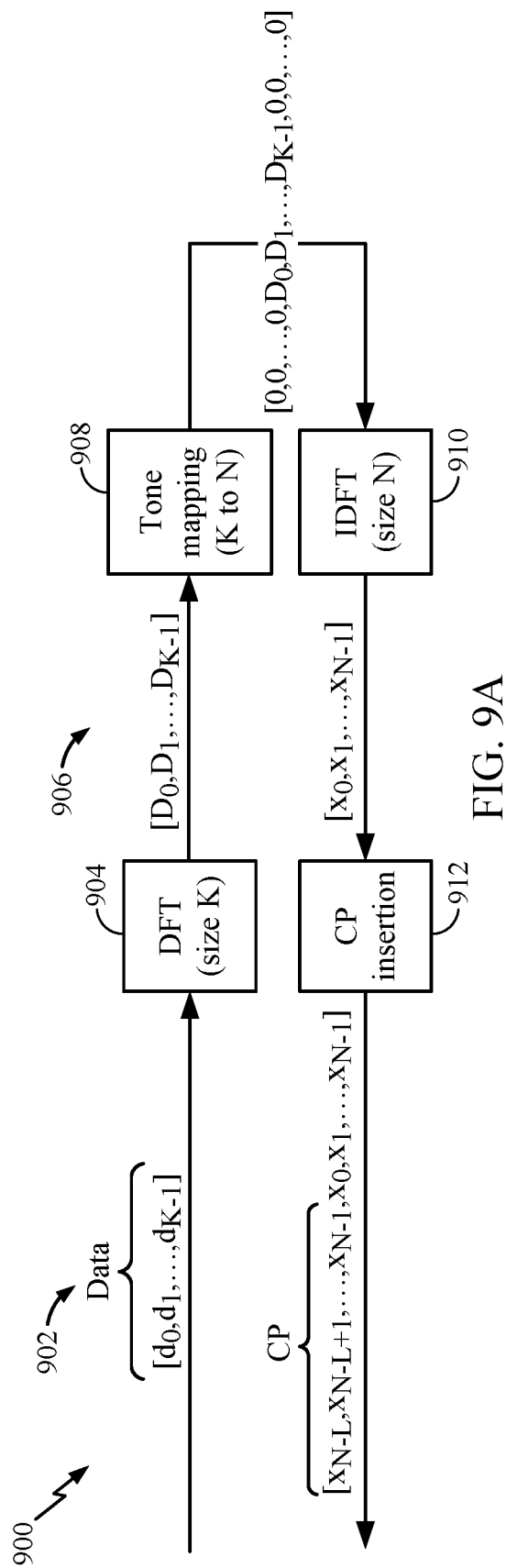
FIGS. 9A & 9B illustrate generation of a discrete Fourier transform (DFT) single-carrier frequency division multiplexing (DFT-s-FDM) waveform, in accordance with certain aspects of the present disclosure.
Figure 9B:
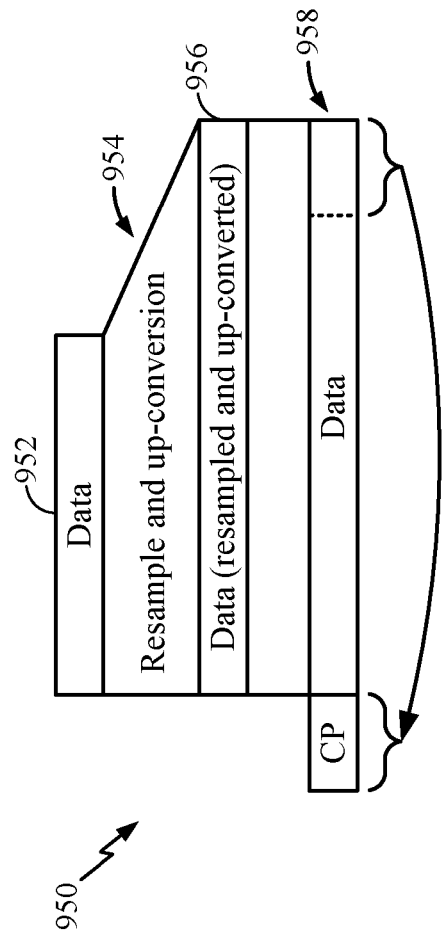

FIGS. 9A & 9B illustrate generation of a DFT-s-FDM waveform. The DFT-s-FDM waveform may be generated for transmission by a transmitter of a BS or UE, such as BS 110a or UE 120, shown in FIG. 1. In the timeline 900 shown in FIG. 9A, at 902, a sequence of K data samples $d_0, d_1, \ldots d_{K-1}$ are obtained by the transmitter. At 904, the transmitter performs a DFT of size K on the K data samples to generate K frequency domain samples $D_0, D_1, \ldots D_{K-1}$ of the data at 906. At 908, the transmitter maps the K frequency domain samples to N tones of bandwidth on which the transmitter will transmit the signal, where N≥K. The transmitter maps the K frequency domain samples to K consecutive tones within the N tones, and maps zeroes to the tones which do not have a frequency domain sample mapped. The transmitter then performs an IDFT of size N on the N zeroes and frequency domain samples at 910 to generate N time domain samples $x_0, x_1, \ldots x_{N-1}$. At 912, the transmitter inserts a cyclic prefix by copying the last L time domain samples $x_{N-L}, x_{N-L+1}, \ldots x_{N-1}$ to the beginning of the time domain samples before transmitting the time domain samples as a single-carrier signal.

FIG. 9B is a diagram 950 illustrating generation of a DFT-s-FDM waveform. The data at 952 (e.g., K data samples $d_0, d_1, \ldots d_{K-1}$ as shown in FIG. 9A) is first resampled and upconverted at 954 to create resampled and up-converted data (e.g., N time domain samples $x_0, x_1, \ldots x_{N-1}$ as shown in FIG. 9A) 956. Then, at 958, samples at the end of the resampled and up-converted data are copied to the front of the resampled and up-converted data to create a cyclic prefix for the transmission A transmitter configured to transmit DFT-s-FDM transmissions, such as those described in FIGS. 9A and 9B, may use a fast Fourier transform (FFT) during a transmission of a size sufficient to cover one data segment (e.g., K in the transmission illustrated in FIG. 9A). A transmitter configured to transmit DFT-s-FDM transmissions may have a lower PAPR than some other transmitters, but typically not as low as the PAPR of an SC-QAM transmitter.

In a communication system using DFT-s-FDM transmissions, some transmission resources may be used for PTRS, which may increase the overhead of transmissions of the system. That is, using transmission resources to transmit PTRS decreases the proportion of transmission resources useful for transmitting data. If fixed known samples in time domain are inserted in each symbol, then the phase of the samples across symbols may be compared to compute phase error.

Figure 10A:
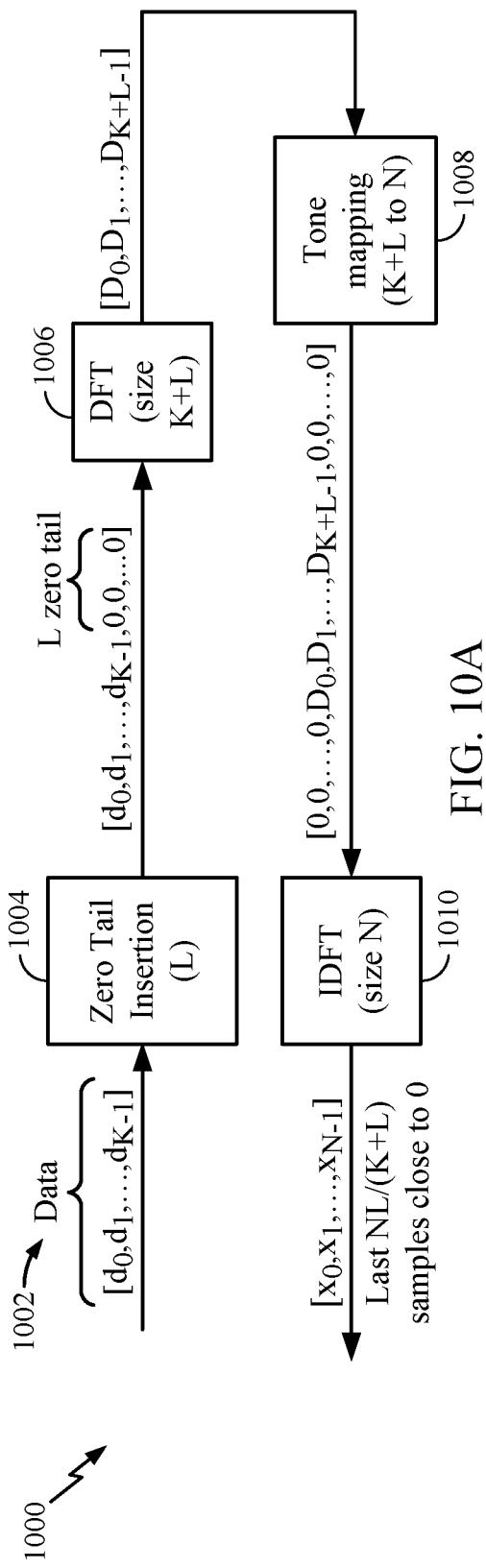
FIGS. 10A & 10B illustrate generation of a zero tail discrete Fourier transform single-carrier frequency division multiplexing (ZT-DFT-s-FDM) waveform, in accordance with certain aspects of the present disclosure.
Figure 10B:
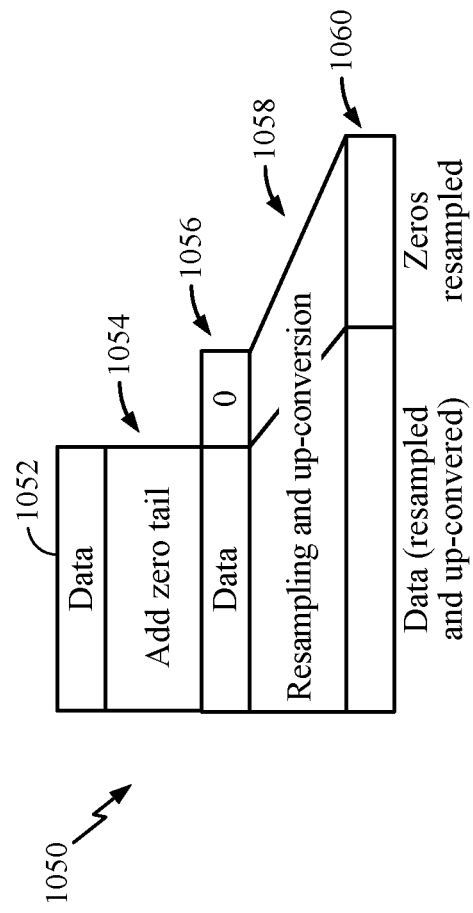

FIGS. 10A & 10B illustrate generation of a ZT-DFT-s-FDM waveform. The ZT-DFT-s-FDM waveform may be generated for transmission by a transmitter of a BS or UE, such as BS 110a or UE 120, shown in FIG. 1. In the timeline 1000 shown in FIG. 10A, at 1002, a sequence of K data samples $d_0, d_1, \ldots d_{K-1}$ are obtained by the transmitter. At 1004, the transmitter inserts a zero tail consisting of L zeroes. The transmitter then performs a DFT of size K+L on the K data samples and L zeroes to generate K+L frequency domain samples $D_0, D_1, \ldots D_{K-L-1}$ of the data, at 1006. At 1008, the transmitter maps the K+L frequency domain samples to N tones of bandwidth on which the transmitter will transmit the signal, where N≥K−L. The transmitter maps the K+L frequency domain samples to K+L consecutive tones within the N tones, and maps zeroes to the tones which do not have a frequency domain sample mapped. The transmitter then performs an IDFT of size N on the N zeroes and frequency domain samples at 1010 to generate N time domain samples $x_0, x_1, \ldots x_{N-1}$. Due to the insertion of the zero tail at 1004, the last NL/(K+L) time domain samples typically have values that are near zero.

FIG. 10B is a diagram 1050 illustrating generation of a ZT-DFT-s-FDM waveform. The data at 1052 (e.g., K data samples $d_0, d_1, \ldots d_{K-1}$ as shown in FIG. 10A) is concatenated with zeroes (e.g., L zeroes shown in FIG. 10A) at 1054 to create a set of data samples and zeroes at 1056. The data samples and zeroes are resampled and up-converted, at 1058 to generate time domain samples (e.g., N time domain samples $x_0, x_1, \ldots, x_{N-1}$ as shown in FIG. 10A) 1060 for transmission.

Generation of a ZT-DFT-s-FDM waveform is similar in some ways to generation of a DFT-s-FDM waveform. One dissimilarity is that size of an FFT used in generation of a ZT-DFT-s-FDM waveform is equal to the size of a data segment plus the size of the zero tail concatenated with the data segment (as described above with reference to FIG. 10A), while size of an FFT used in generation of a DFT-s-FDM waveform is equal to the size of a data segment (as described above with reference to FIG. 9A). Using a ZT-DFT-s-DFM waveform in a communications system may enable the system to have improved flexibility in selecting length of a CP to be used by the system. In addition, a system using ZT-DFT-s-FDM waveform transmissions can trade-off zero filling length (i.e., the size of the zero tail) and data length (i.e., the number of data elements in a data segment) while using a consistent FFT size that is equal to the sum of the length of a zero tail and the length of a data segment.

In a communication system using ZT-DFT-s-FDM transmissions, some transmission resources may be used for PTRS, which may increase the overhead of transmissions of the system. That is, using transmission resources to transmit PTRS decreases the proportion of transmission resources useful for transmitting data. If fixed known samples in time domain are inserted in each symbol, then the phase of the samples across symbols may be compared to compute phase error.

Figure 11A:
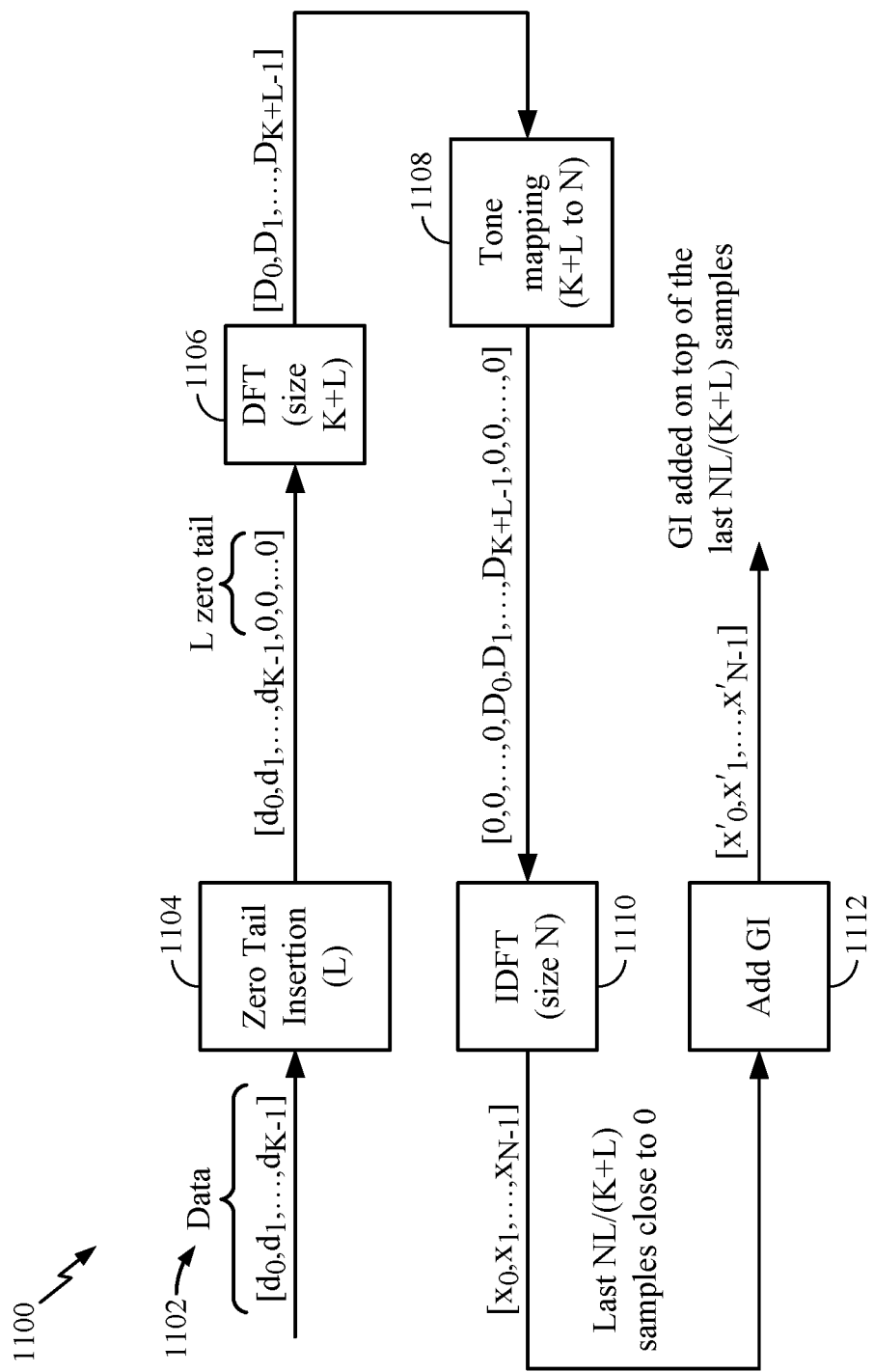
FIGS. 11A, 11B, & 11C illustrate generation of a guard interval discrete Fourier transform single-carrier frequency division multiplexing (GI-DFT-s-FDM) waveform, in accordance with certain aspects of the present disclosure.
Figure 11B:
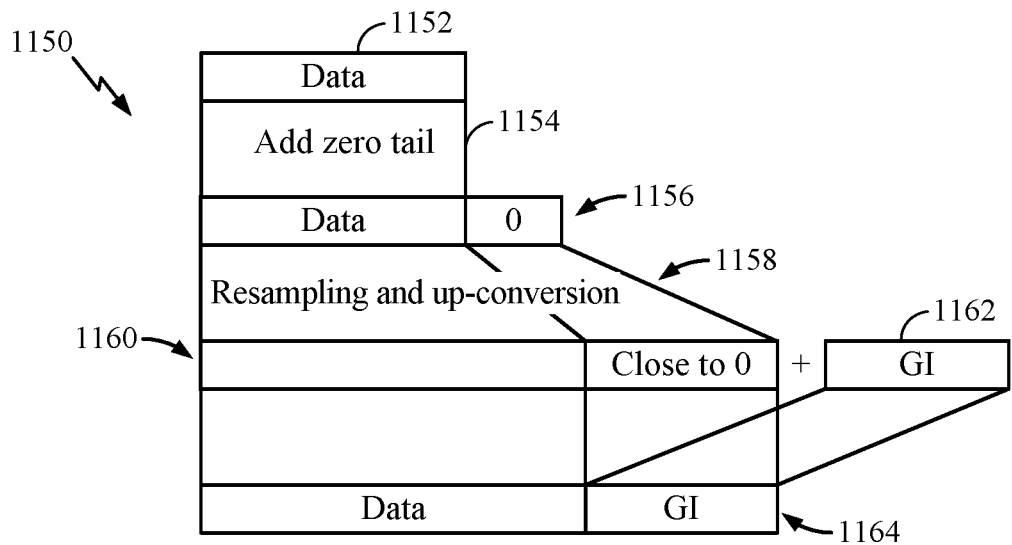
Figure 11C:
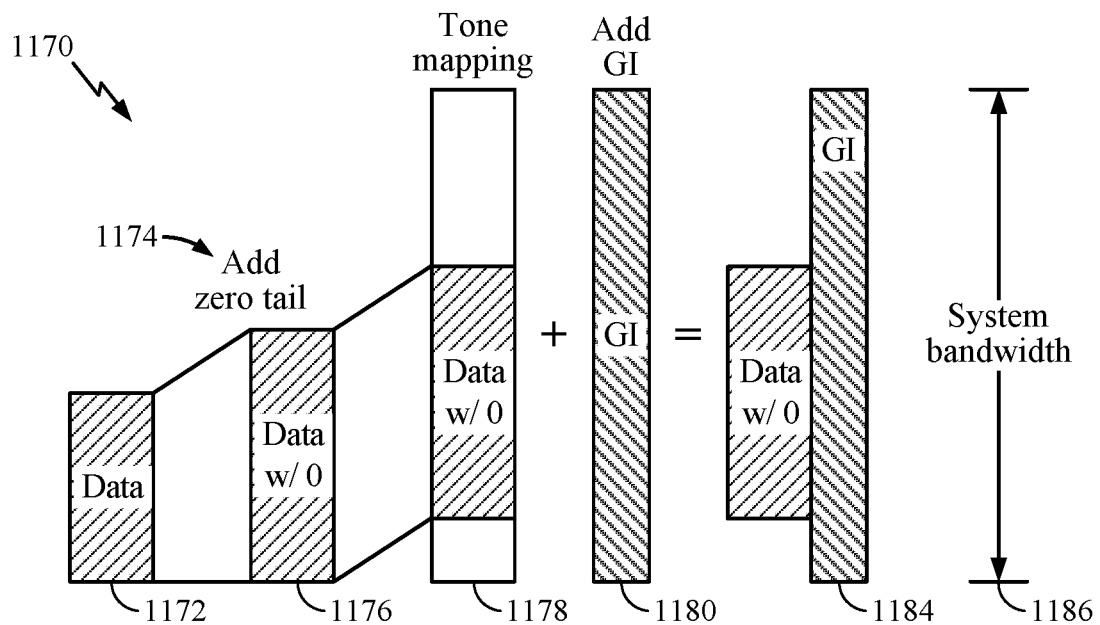

FIGS. 11A, 11B, & 11C illustrate generation of a GI-DFT-s-FDM waveform. The GI-DFT-s-FDM waveform may be generated for transmission by a transmitter of a BS or UE, such as BS 110a or UE 120, shown in FIG. 1. In the timeline 1100 shown in FIG. 11A, at 1102, a sequence of K data samples $d_0, d_1, \ldots d_{K-1}$ are obtained by the transmitter. At 1104, the transmitter inserts a zero tail consisting of L zeroes. The transmitter then performs a DFT of size K+L on the K data samples and L zeroes to generate K+L frequency domain samples $D_0, D_1, \ldots D_{K-L-1}$ of the data, at 1106. At 1108, the transmitter maps the K+L frequency domain samples to N tones of bandwidth on which the transmitter will transmit the signal, where N≥K−L. The transmitter maps the K+L frequency domain samples to K+L consecutive tones within the N tones, and maps zeroes to the tones which do not have a frequency domain sample mapped. The transmitter then performs an IDFT of size N on the N zeroes and frequency domain samples at 1110 to generate N time domain samples $x_0, x_1, \ldots x_{N-1}$. Due to the insertion of the zero tail at 1104, the last NL/(K+L) time domain samples typically have values that are near zero. At 1112, the transmitter adds samples of a wideband guard interval (GI) to the N time domain samples to generate N new time domain samples, $x'_0, x'_1, \ldots x'_{N-1}$. The transmitter adds samples of the GI to the last NL/(K+L) time domain samples, while leaving the other time domain samples unchanged (e.g., $x'_0=x_0$).

FIG. 11B is a diagram 1150 illustrating generation of a GI-DFT-s-FDM waveform. The data at 1152 (e.g., K data samples $d_0, d_1, \ldots d_{K-1}$ as shown in FIG. 11A) is concatenated with zeroes (e.g., L zeroes shown in FIG. 11A) at 1154 to create a set of data samples and zeroes at 1156. The data samples and zeroes are resampled and up-converted, at 1158, to generate time domain samples (e.g., N time domain samples $x_0, x_1, \ldots x_{N-1}$ as shown in FIG. 11A) 1160. Samples of a GI 1162 are added to the last time domain samples to generate new time domain samples 1164 before they are transmitted as a single-carrier transmission.

FIG. 11C is a diagram 1170 illustrating generation of a GI-DFT-s-FDM waveform. The data at 1172 (e.g., K data samples $d_0, d_1, \ldots d_{K-1}$ as shown in FIG. 11A) is concatenated with zeroes (e.g., L zeroes shown in FIG. 11A) at 1174 to create a set 1176 of data samples and zeroes. The data samples and zeroes are resampled, up-converted and mapped to tones at 1178 to generate time domain samples (e.g., N time domain samples $x_0, x_1, \ldots x_{N-1}$ as shown in FIG. 11A). Samples of a GI 1180 are added to the last time domain samples to generate new time domain samples 1184 before they are transmitted as a single-carrier transmission over the system bandwidth 1186.

Generation of a GI-DFT-s-FDM waveform is similar in some ways to generation of a ZT-DFT-s-FDM waveform. One way in which the processes are dissimilar is in the adding of the GI on top of the zero tail post IDFT in the generation of the GI-DFT-s-FDM waveform. The GI is added in the time domain, so a transmitter generating a GI-DFT-s-FDM waveform has a low PAPR that may be similar to the PAPR of a transmitter generating a ZT-DFT-s-DFM waveform. A transmitter generating a GI-DFT-s-FDM waveform may use a FFT of a size equal to the number of data samples and zeroes (e.g., K+L in FIG. 11A). The GI+zero-tail associated with a previous symbol may serve as a CP for a current symbol. The GI can be used for time and frequency synchronization (e.g., between the receiver and the transmitter), because the GI is a known sequence.

In addition, a system using GI-DFT-s-FDM waveform transmissions can use the GI as a PTRS. A receiver receiving GI-DFT-s-FDM waveform transmissions may compare the phase of the time domain samples of GI post equalization across symbols to compute phase error. However, the GI is not the same bandwidth as the data in a transmission, as shown in FIG. 11C. The GI did not follow the same up-conversion as the data and is a time domain sequence independent from data sample rate. Thus, each symbol in a system using GI-DFT-s-FDM waveform transmissions is a narrower band signal (data) followed by a wide band GI (though short in time), as illustrated in FIG. 11C.

Example Waveform for Millimeter Wave New Radio

In communications systems operating according to millimeter-wave (mmW) new radio (NR) (e.g., 5G) standards, single-carrier waveforms, in addition to OFDMA waveforms, may be used by devices to extend the DL link budget. That is, use of a single-carrier waveform may improve power levels of received downlink signals at receiving devices. The single-carrier waveform may allow a lower peak-to-average-power ratio (PAPR) of the signal, which may allow a power amplifier (PA) of a transmit chain to use a higher transmit power level. PreDFT (i.e., prior to a discrete Fourier transform) guard-interval insertion DFT single-carrier frequency domain multiplexing (PreDFT-GI-DFT-s-FDM) is one type of single-carrier waveform that may be used for downlink signals.

Figure 12A:
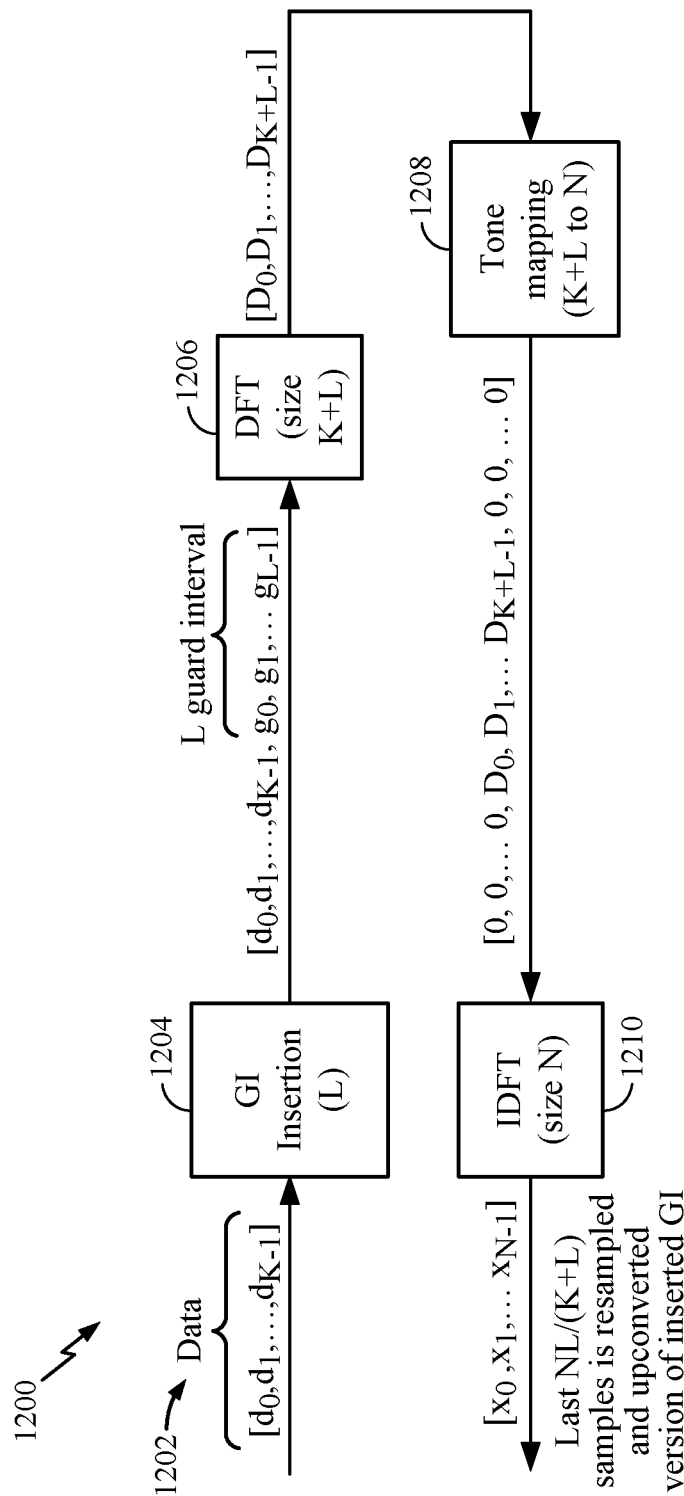
FIGS. 12A, 12B, & 12C illustrate generation of a PreDFT guard interval discrete Fourier transform single-carrier frequency division multiplexing (PreDFT-GI-DFT-s-FDM) waveform, in accordance with certain aspects of the present disclosure.
Figure 12B:
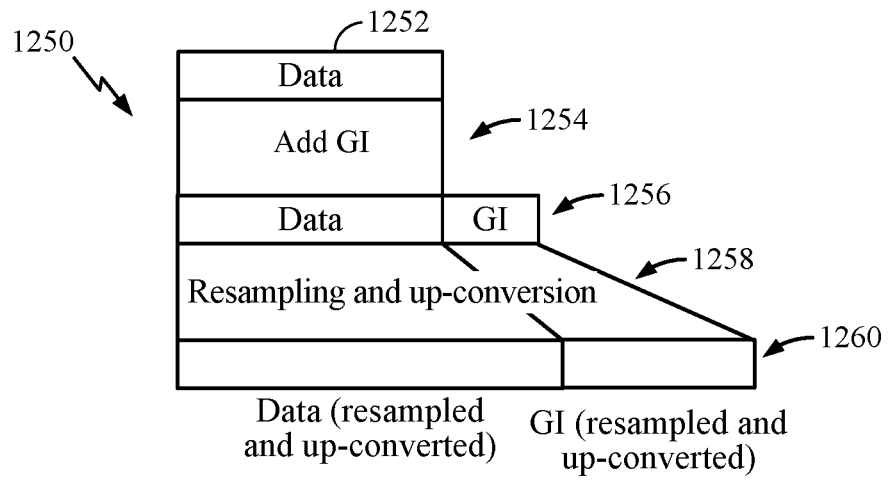
Figure 12C:
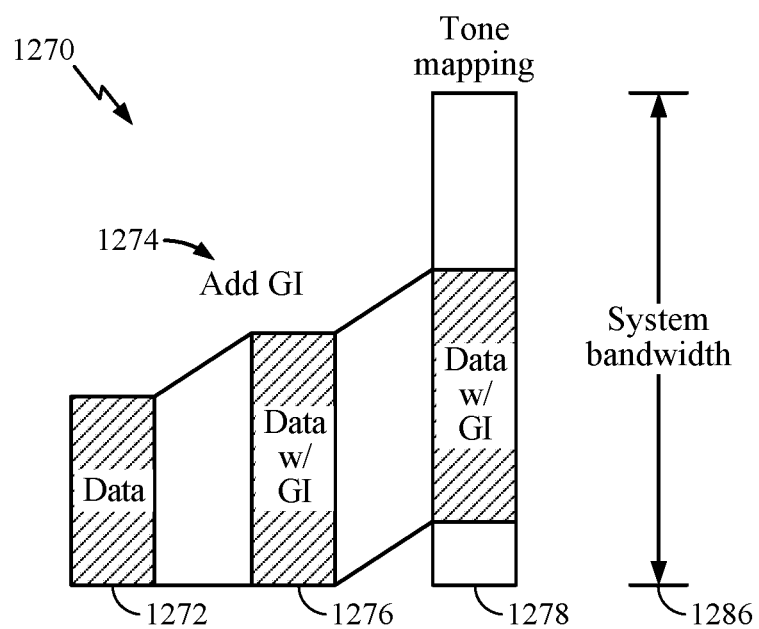

FIGS. 12A, 12B, & 12C illustrate generation of a PreDFT-GI-DFT-s-FDM waveform signal. The PreDFT-GI-DFT-s-FDM waveform may be generated for transmission by a transmitter of a BS or UE, such as BS 110a or UE 120, shown in FIG. 1. In the timeline 1200 shown in FIG. 12A, at 1202, a sequence of K data samples $d_0, d_1, \ldots d_{K-1}$ are obtained by the transmitter. At 1204, the transmitter concatenates the sequence of data samples with L samples $g_0, g_1, \ldots g_{L-1}$ of a guard interval (GI) sequence (e.g., a known sequence). The transmitter then performs a DFT of size K+L on the K data samples and L GI samples to generate K+L frequency domain samples $D_0, D_1, \ldots D_{K+L-1}$ of the data and GI, at 1206. At 1208, the transmitter maps the K+L frequency domain samples to N tones of bandwidth on which the transmitter will transmit the signal, where N≥K+L. The transmitter maps the K+L frequency domain samples to K+L consecutive tones within the N tones, and maps zeroes to the tones which do not have a frequency domain sample mapped. The transmitter then performs an IDFT of size N on the N zeroes and frequency domain samples at

1210 to generate N time domain samples $x_0, x_1, \ldots x_{N-1}$. Due to the insertion of the GI at 1204, the last NL/(K+L) time domain samples typically have values that are a resampled and upconverted version of the GI.

FIG. 12B is a diagram 1250 illustrating generation of a PreDFT-GI-DFT-s-FDM waveform. The data at 1252 (e.g., K data samples $d_0, d_1, \ldots d_{K-1}$ as shown in FIG. 12A) is concatenated with samples of a GI sequence (e.g., L GI samples $g_0, g_1, \ldots g_{L-1}$ shown in FIG. 12A) at 1254 to create a set of data samples and GI samples at 1256. The data samples and GI samples are resampled and up-converted, at 1258 to generate time domain samples (e.g., N time domain samples $x_0, x_1, \ldots x_{N-1}$ as shown in FIG. 12A) 1260, which may be transmitted as a single-carrier transmission.

FIG. 12C is a diagram 1270 illustrating generation of a PreDFT-GI-DFT-s-FDM waveform. The data at 1272 (e.g., K data samples $d_0, d_1, \ldots, d_{K-1}$ as shown in FIG. 12A) is concatenated with samples of a GI sequence (e.g., L samples $g_0, g_1, \ldots g_{L-1}$ shown in FIG. 12A) at 1274 to create a set 1276 of data samples and GI samples. The data samples and GI samples are resampled, up-converted and mapped to tones at 1278 to generate time domain samples (e.g., N time domain samples $x_0, x_1, \ldots x_{N-1}$ as shown in FIG. 12A) that may be transmitted as a single-carrier transmission over the system bandwidth 1286.

Figure 13:
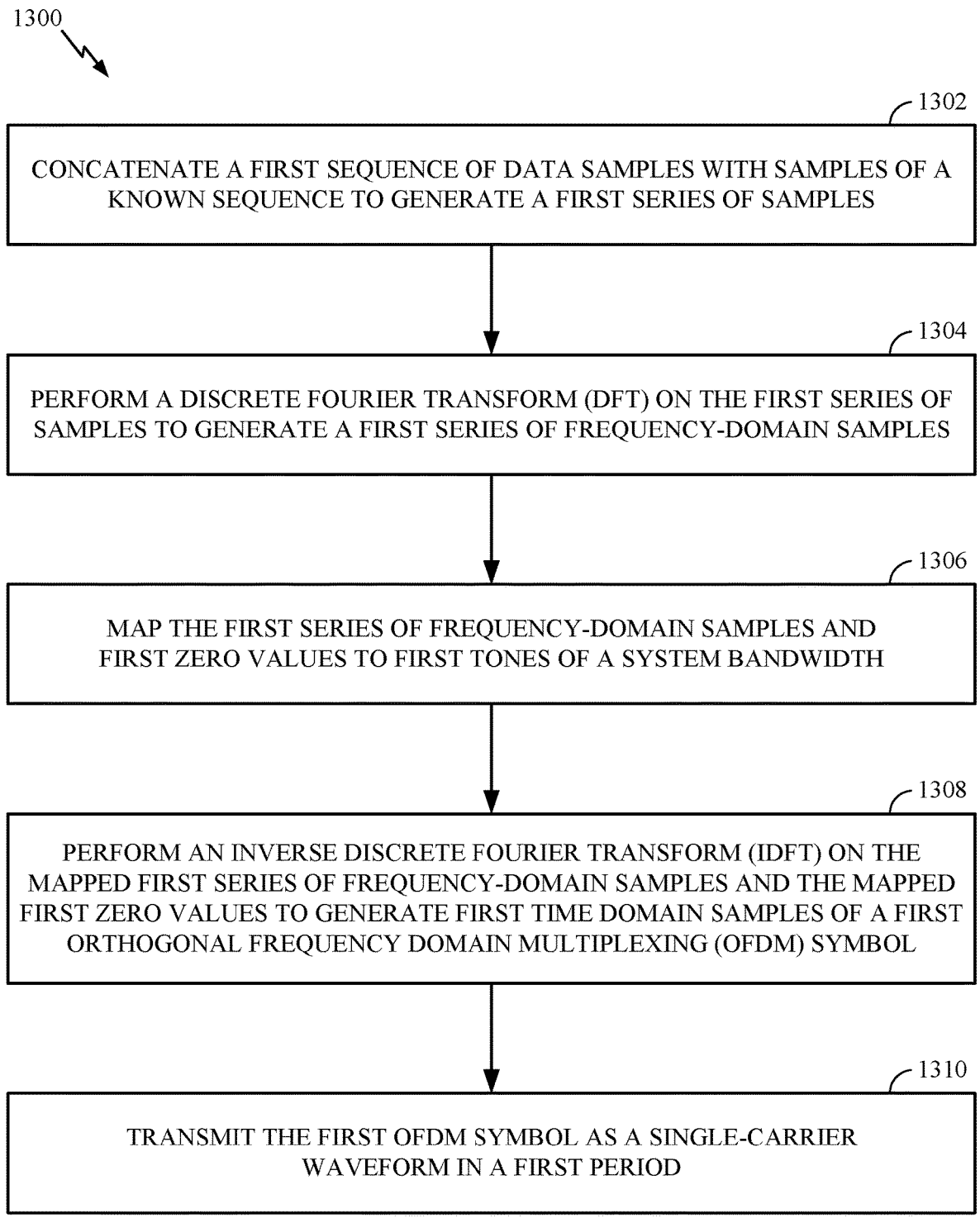
FIG. 13 illustrates example operations for wireless communications, in accordance with aspects of the present disclosure.

FIG. 13 illustrates example operations 1300 for wireless communications, in accordance with aspects of the present disclosure. Operations 1300 may be performed by a BS, for example, BS 110, or a UE, for example UE 120 shown in FIG. 1.

Operations 1300 begin, at block 1302, with concatenating a first sequence of data samples with samples of a known sequence to generate a first series of samples. For example, BS 110 concatenates a sequence of K data samples $d_0, d_1, \ldots, d_{K-1}$ with L samples $g_0, g_1, \ldots g_{L-1}$ of a known sequence (e.g., a GI sequence) to generate a first series of K+L samples.

At block 1304, operations 1300 continue with performing a discrete Fourier transform (DFT) on the first series of samples to generate a first series of frequency-domain samples. Continuing the example from above, BS 110 performs a DFT on the first series of K+L samples (i.e., the series from block 1302) to generate a first series of frequency-domain samples.

Operations 1300 continue at block 1306 with mapping the first series of frequency-domain samples and first zero values to first tones of a system bandwidth. Continuing the example from above, BS 110 maps the first series of frequency-domain samples (i.e., from block 1304) and first zero values to first tones of a system bandwidth.

At block 1308, operations 1300 continue with performing an inverse discrete Fourier transform (IDFT) on the mapped first series of frequency-domain samples and the mapped first zero values to generate first time domain samples of a first orthogonal frequency domain multiplexing (OFDM) symbol. Continuing the example from above, BS 110 performs an IDFT on the mapped first series of frequency-domain samples and first zero values (i.e., from block 1306) to generate first time domain samples of a first OFDM symbol.

Operations 1300 continue at block 1310 with transmitting the first OFDM symbol as a single-carrier waveform in a first period. Continuing the example from above, BS 110 transmits the first OFDM symbol (i.e., from block 1308) as a single-carrier waveform in a first period.

According to aspects of the present disclosure, and as illustrated in FIG. 12A, the DFT of block 1304 may have a size equal to the number of samples in the first series of samples of block 1304.

In aspects of the present disclosure, the first frequency-domain samples may be mapped to consecutive tones of the bandwidth in block 1306.

According to aspects of the present disclosure, a transmitting device may repeat operations 1300 for new data samples while using the same samples of the known sequence (e.g., guard interval samples) in order to transmit a second OFDM symbol in a period consecutive with the first OFDM symbol of block 1310. That is, the transmitting device may concatenate a second sequence of data samples with samples of the known sequence to generate a second series of samples; perform a discrete Fourier transform (DFT) on the second series of samples to generate a second series of frequency-domain samples; map the second series of frequency-domain samples and second zero values to second tones of the system bandwidth (i.e., the system bandwidth of block 1310); perform an inverse discrete Fourier transform (IDFT) on the mapped second series of frequency-domain samples and the mapped second zero values to generate second time domain samples of a second OFDM symbol; and transmit the second OFDM symbol as a single-carrier waveform in a second period, wherein the first period and the second period are consecutive periods.

Figure 14:
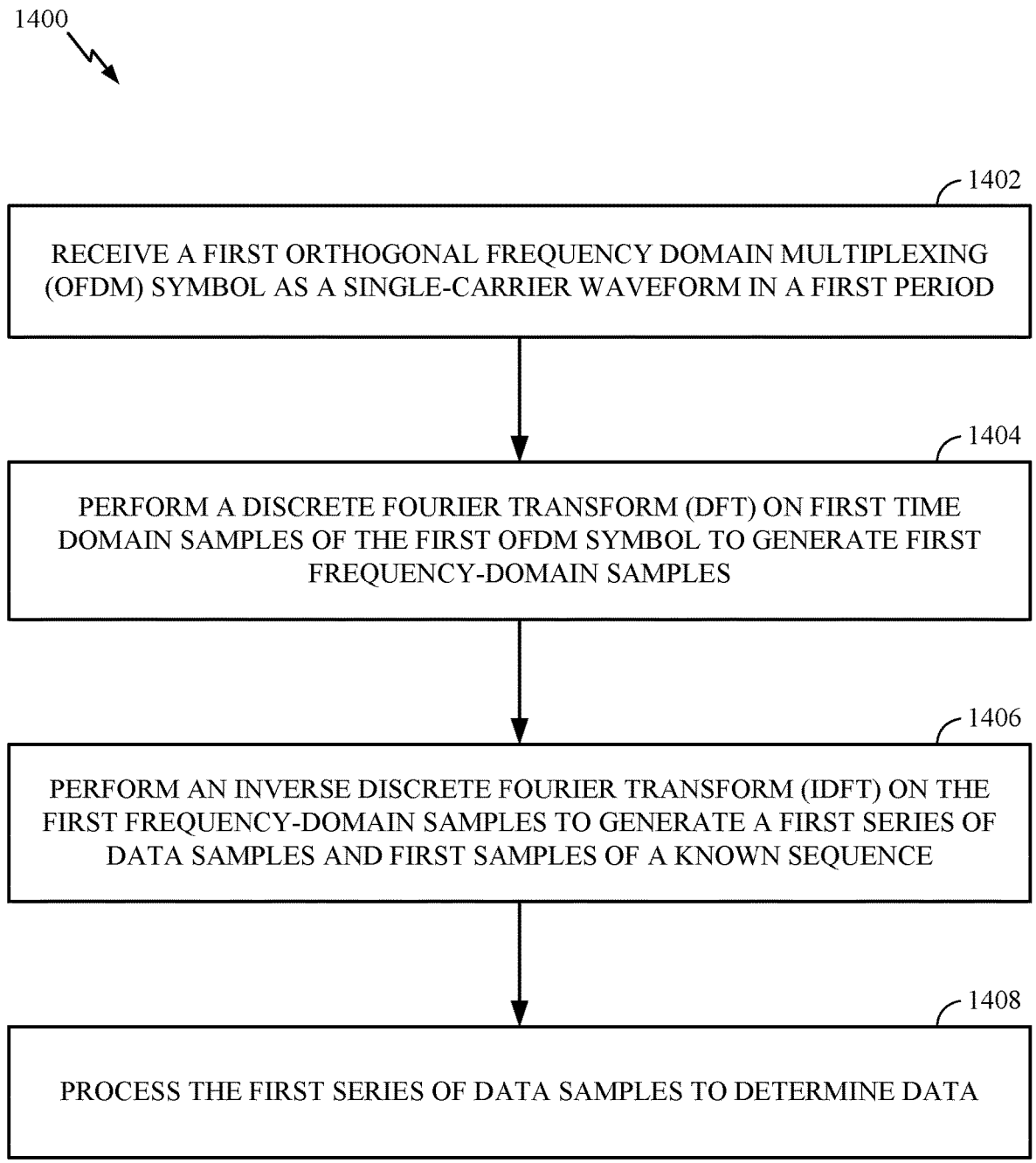
FIG. 14 illustrates example operations for wireless communications, in accordance with aspects of the present disclosure.

FIG. 14 illustrates example operations 1400 for wireless communications, in accordance with aspects of the present disclosure. Operations 1400 may be performed by a UE or a BS, for example, UE 120 or BS 110, shown in FIG. 1. Operations 1400 may be complementary to operations 1300, shown in FIG. 13.

Operations 1400 begin, at block 1402, with receiving a first orthogonal frequency domain multiplexing (OFDM) symbol as a single-carrier waveform in a first period. For example, UE 120, shown in FIG. 1, receives a first OFDM symbol as a single-carrier waveform in a first period.

At block 1404, operations 1400 continue with performing a discrete Fourier transform (DFT) on first time domain samples of the first OFDM symbol to generate first frequency-domain samples. Continuing the example from above, UE 120 performs a DFT on first time domain samples of the first OFDM symbol (i.e., from block 1402) as a single-carrier waveform in a first period.

Operations 1400 continue at block 1406 with performing an inverse discrete Fourier transform (IDFT) on the first frequency-domain samples to generate a first series of data samples and first samples of a known sequence. Continuing the example from above, UE 120 performs an IDFT on the first frequency-domain samples (i.e., from block 1404) to generate a first series of data samples and first samples of a known sequence.

At block 1408, operations 1400 continue with processing the first series of data samples to determine data. Continuing the example from above, UE 120 processes the first series of data samples (i.e., from block 1406) to determine data (e.g., to be supplied to an application running on the UE).

According to aspects of the present disclosure, the IDFT in block 1406 may have a size equal to a number of non-zero samples in the first frequency-domain samples (i.e., from block 1404).

In aspects of the present disclosure, the first frequency-domain samples of block 1404 may be mapped to consecutive tones of a bandwidth (e.g., a bandwidth on which the UE or BS received the OFDM symbol).

According to aspects of the present disclosure, a receiving device may repeat operations 1400 in receiving a second OFDM symbol in a period consecutive with the period of the first OFDM symbol and use the samples of the known sequence to track frequency, time, and/or phase of the transmitter. That is, the receiving device may receive a second OFDM symbol as a single-carrier waveform in a second period, wherein the first period and the second period are consecutive periods; perform a discrete Fourier transform (DFT) on second time-domain samples of the second OFDM symbol to generate second frequency-domain samples; perform an inverse discrete Fourier transform (IDFT) on the second frequency-domain samples to generate a second series of data samples and second samples of the known sequence; and compare the first samples of the known sequence with second samples of the known sequence to track phase of a transmitter transmitting the first OFDM symbol and the second OFDM symbol.

Generation of a PreDFT-GI-DFT-s-FDM waveform is similar in some ways to mixing generation of a ZT-DFT-s-FDM waveform with generation of an SC-QAM with GI waveform. As compared to generation of a ZT-DFT-s-FDM waveform, generation of a PreDFT-GI-DFT-s-FDM waveform involves insertion of a GI sequence into the data samples, instead of the zero tail that is inserted when generating a ZT-DFT-s-FDM waveform. Because the GI is added in time domain, a transmitter generating a PreDFT-GI-s-FDM waveform may have a low PAPR. In addition, the GI is the same bandwidth as the data because processing of the GI samples follows the same processing chain used to process the data. Because the GI is the same bandwidth as the data, multiple transmitters may be multiplexed in frequency, which is difficult for systems using the GI-DFT-s-FDM waveform, where the GI covering the entire system bandwidth makes multiplexing multiple transmissions problematic. A transmitter generating a PreDFT-GI-DFT-s-FDM waveform may use a FFT of a size equal to the number of data samples plus the number of GI samples (e.g., K+L in FIG. 12A). The GI associated with a previous symbol may serve as a CP for a current symbol. The GI can be used for time and frequency synchronization (e.g., between the receiver and the transmitter), because the GI is a known sequence.

In addition, a system using PreDFT-GI-DFT-s-FDM waveform transmissions can use the GI as a PTRS. A receiver receiving PreDFT-GI-DFT-s-FDM waveform transmissions may compare the phase of the time domain samples of GI post equalization across symbols to compute phase error.

When a known sequence used as a GI of PreDFT-GI-DFT-s-FDM waveform transmissions is selected to be used as a phase tracking reference signal (PTRS) (i.e., a sequence that can be used as a PTRS is selected as a sequence to be used as a GI in a PreDFT-GI-DFT-s-FDM waveform), then that type of waveform may be referred to as a phase tracking reference signal cyclic prefix discrete Fourier transform single-carrier frequency division multiplexing (PTRS-CP-DFT-s-FDM) waveform. The PTRS-CP-DFT-s-FDM waveform may be considered to be a special case of the PreDFT-GI-DFT-s-FDM waveform.

A transmitter generating a PTRS-CP-DFT-s-FDM waveform may follow the process illustrated in FIGS. 12A-12C by inserting a PTRS as the known sequence at the end of the data samples before performing a DFT on the data samples and PTRS. As with PreDFT-GI-DFT-s-FDM, because the PTRS is added in time domain, a transmitter generating a PTRS-CP-DFT-s-FDM waveform may have a low PAPR.

Also similar to PreDFT-GI-DFT-s-FDM waveforms, the PTRS portion of a current OFDM symbol may serve as a CP of a next OFDM symbol.

According to aspects of the present disclosure, a combination PTRS and CP of a PTRS-CP-DFT-s-FDM waveform may be equalized at a receiver before phase noise and frequency offset (FO) estimation by the receiver.

In aspects of the present disclosure, a pure time-domain RS sequence may cause a receiver to either have to deal with channel equalization or suffer from noise enhancement if phase difference is to be estimated based on the pure time-domain RS sequence.

Figure 15A:
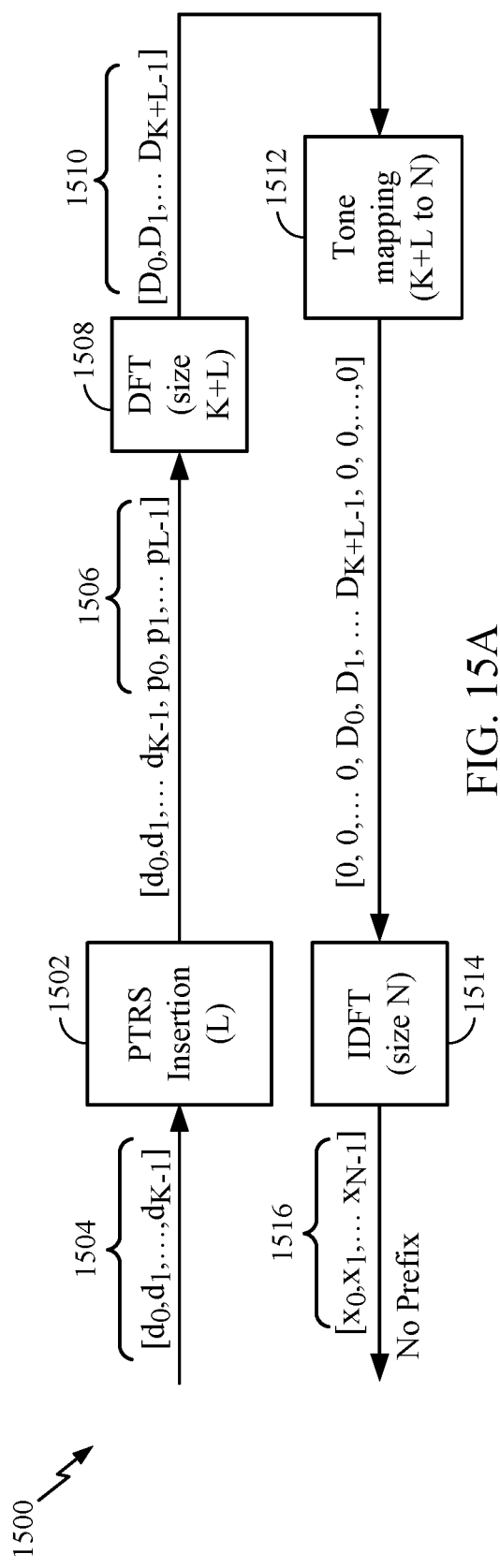
FIGS. 15A & 15B are diagrams illustrating generation and reception of a phase tracking reference signal cyclic prefix discrete Fourier transform single-carrier frequency division multiplexing (PTRS-CP-DFT-s-FDM) waveform, in accordance with certain aspects of the present disclosure.
Figure 15B:
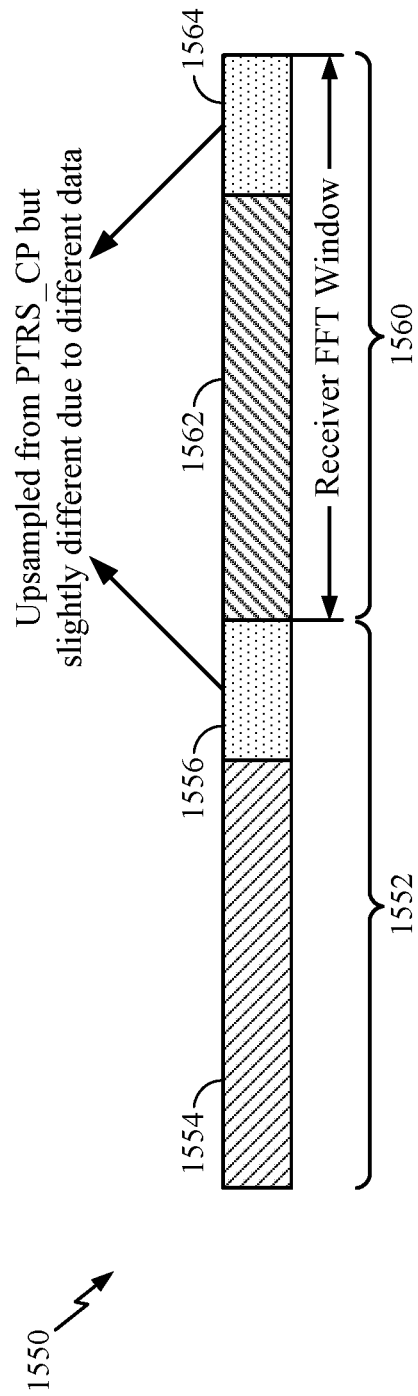

FIGS. 15A & 15B are diagrams 1500 and 1550 illustrating generation of a PTRS-CP-DFT-s-FDM waveform and reception of a PTRS-CP-DFT-s-FDM waveform transmission. In diagram 1500, at 1502, time-domain data samples 1504 are concatenated with time-domain PTRS samples 1506. The data samples and PTRS samples are processed through a DFT 1508 to generate frequency-domain samples 1510, which are mapped to tones at 1512. Zeroes may be mapped to unused tones, if any. An inverse fast Fourier transform 1514 converts the mapped frequency-domain samples and zeroes to time-domain samples 1516, which may be transmitted as an OFDM symbol using a single-carrier waveform without copying an end portion of the time-domain samples to the beginning of the symbol to create a cyclic prefix (CP), i.e., "No Prefix," as illustrated.

FIG. 15B is a diagram 1550 illustrating reception of a transmission transmitted using a PTRS-CP-DFT-s-FDM waveform. A first symbol is transmitted in a first period (e.g., a transmission time interval (TTI) or a slot) at 1552. The first transmission includes a first portion 1554 that is mostly upsampled and converted from data samples and a second portion 1556 that is mostly upsampled and converted PTRS_CP samples (i.e., samples of a known sequence to be used as a PTRS and/or a CP). Similarly, the second transmission includes a first portion 1562 that is mostly upsampled and converted from data samples and a second portion 1564 that is mostly upsampled and converted PTRS CP samples. The data transmitted by the two symbols is different, thus causing the first portion 1554 to differ from the first portion 1562. The second portion 1556 is similar to the second portion 1564 because both are mostly upsampled and converted PTRS_CP samples, however, the second portion 1556 and the second portion 1564 are not identical. This may cause the receiver to detect a CP mismatch while receiving the symbol.

According to aspects of the present disclosure, due to circular convolution of DFT-IFFT based upsampling (e.g., DFT-IDFT based upsampling as described above with reference to FIGS. 9A-12A), samples at the two edges of a CP (e.g., a CP generated by DFT-IFFT upsampling of a PTRS_CP sequence) may be affected by the beginning and the end of the data samples, respectively. The interpolation (e.g., sine cardinal (sinc)) function for the CP decays at a rate proportional to $1/\Delta k$, with k equal to the pre-DFT sample index. Thus, the first couple of data samples will be most affected by a CP mismatch.

Figure 16:
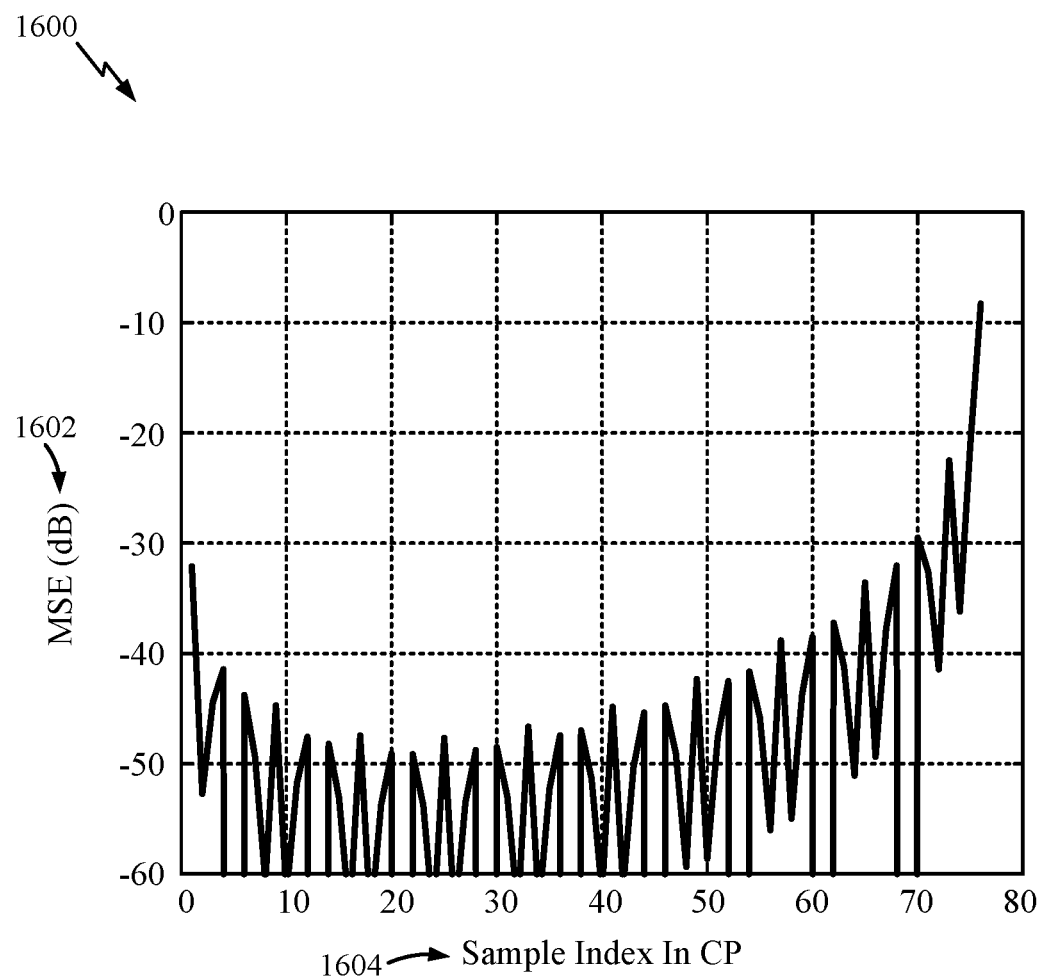
FIG. 16 is a graph illustrating a relationship between mean squared error (MSE) in interpolating a data sample and a sample index of a cyclic prefix, in accordance with certain aspects of the present disclosure.

FIG. 16 is a graph 1600 illustrating a relationship between mean squared error (MSE) 1602 in interpolating a data sample and a sample index 1604 of a CP for a signal generated using a 1024 point FFT, a 640 point DFT, and 76 samples in the CP.

According to aspects of the present disclosure, a modified PTRS-CP-DFT-s-FDM waveform may be used to decrease the effects of the potential CP mismatch described above. A circular shift or adding a few samples (e.g., GI samples) at the beginning of data may improve data interpolation by a receiver receiving the modified PTRS-CP-DFT-s-FDM waveform as compared to the unmodified PTRS-CP-DFT-s-FDM waveform.

In aspects of the present disclosure, adding two more samples at the beginning of data samples while generating a modified PTRS-CP-DFT-s-FDM waveform may improve data interpolation by a receiver receiving the modified PTRS-CP-DFT-s-FDM waveform.

Figure 17A:
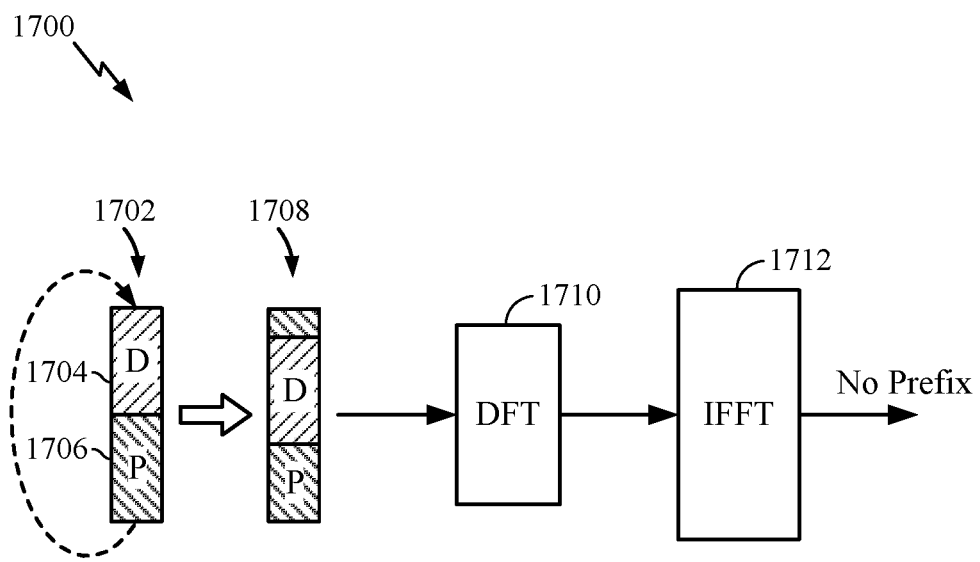
FIGS. 17A & 17B are diagrams illustrating generation of a modified PTRS-CP-DFT-s-FDM waveform and reception of a modified PTRS-CP-DFT-s-FDM waveform transmission, in accordance with certain aspects of the present disclosure.
Figure 17B:
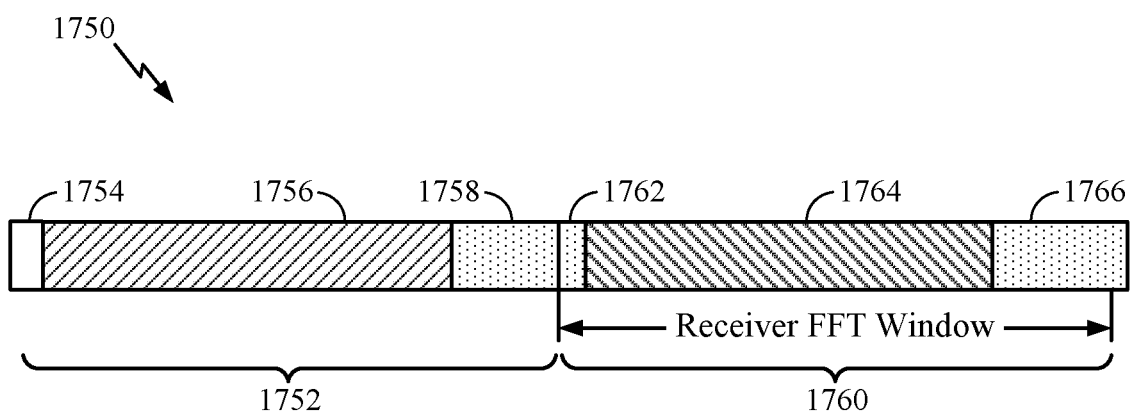

FIGS. 17A & 17B are diagrams 1700 and 1750 illustrating generation of a modified PTRS-CP-DFT-s-FDM waveform and reception of a modified PTRS-CP-DFT-s-FDM waveform transmission. In diagram 1700, at 1702, time-domain data samples 1704 are concatenated with time-domain PTRS samples 1706. Unlike in FIG. 15A, the time-domain data samples 1704 and time-domain PTRS samples 1706 are circularly shifted by the transmitter at 1708. The data samples and PTRS samples are processed through a DFT 1710 to generate frequency-domain samples, which are mapped to tones. Zeroes may be mapped to unused tones. An inverse fast Fourier transform 1712 converts the mapped frequency-domain samples and zeroes to time-domain samples, which may be transmitted as an OFDM symbol using a single-carrier waveform without copying an end portion of the time-domain samples to the beginning of the symbol to create a cyclic prefix (CP), i.e., "No Prefix," as illustrated.

FIG. 17B is a diagram 1750 illustrates reception of a transmission transmitted using a PTRS-CP-DFT-s-FDM waveform. A first symbol is transmitted in a first period (e.g., a transmission time interval (TTI) or a slot) at 1752. The first transmission includes a first portion 1754 that is mostly upsampled and converted PTRS_CP samples (i.e., samples of a known sequence to be used as a PTRS and/or a CP), a second portion 1756 that is mostly upsampled and converted data samples, and a third portion 1758 that is mostly upsampled and converted PTRS_CP samples. Similarly, the second transmission includes a first portion 1762 that is mostly upsampled and converted PTRS_CP samples, a second portion 1764 that is mostly upsampled and converted data samples, and a third portion 1766 that is mostly upsampled and converted PTRS_CP samples. The data transmitted by the two symbols is different, thus causing the second portion 1756 to differ from the second portion 1764. The first portion 1754 is similar but not identical to the first portion 1762 because both are mostly upsampled and converted PTRS CP samples. In a similar manner, the third portion 1758 is similar but not identical to the third portion 1766. Because of the circular shift of the data and PTRS samples at the transmitter (i.e., as illustrated in FIG. 17A), the indices of the data samples are farther from the edges of the CP that may be mismatched, which may improve interpolation of the data samples versus a transmission sent using the unmodified PTRS-CP-DFT-s-FDM waveform.

According to aspects of the present disclosure, numerologies of PreDFT-GI-DFT-s-FDM waveforms, unmodified PTRS-CP-DFT-s-FDM waveforms, and modified PTRS-CP-DFT-s-FDM waveforms may allow systems using those waveforms to co-exist with systems using CP-OFDM waveforms. Systems may also use combinations of those four waveforms.

In aspects of the present disclosure, a communications system may transmit a waveform of one waveform type in one TTI (e.g., a slot or a subframe) and a waveform of a different waveform type in another TTI. The two waveforms may enable different numbers of symbols to be transmitted in the two TTIs, e.g., LTE numerology may be used with 14 CP-OFDM symbols in a slot and 15 DFT-s-FDM symbols in another slot.

According to aspects of the present disclosure, a communications system may transmit a waveform of one waveform type in one TTI (e.g., a slot or a subframe) and a waveform of a different waveform type in another TTI. The two waveforms may use a same symbol duration (i.e., a same number of symbols in each TTI) but have different FFT sizes.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 13 and 14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
concatenating a first sequence of data samples with samples of a known sequence to generate a first series of samples, wherein the known sequence is not all zeroes, and wherein all of the data samples of the first sequence are before all of the samples of the known sequence in the first series;
performing a discrete Fourier transform (DFT) on the first series of samples to generate a first series of frequency-domain samples;
mapping the first series of frequency-domain samples and first zero values to tones of a system bandwidth;
performing an inverse discrete Fourier transform (IDFT) on the mapped first series of frequency-domain samples and the mapped first zero values to generate first time domain samples of a first orthogonal frequency division multiplexing (OFDM) symbol; and
transmitting the first OFDM symbol as a single-carrier waveform in a first period.

2. The method of claim 1, wherein the DFT has a size equal to a number of samples in the first series of samples.

3. The method of claim 1, wherein mapping the first series of frequency-domain samples and the first zero values to the tones of the system bandwidth comprises mapping the first series of frequency-domain samples to consecutive tones of the system bandwidth.

4. The method of claim 1, further comprising:
concatenating a second sequence of data samples with samples of the known sequence to generate a second series of samples;
performing a discrete Fourier transform (DFT) on the second series of samples to generate a second series of frequency-domain samples;
mapping the second series of frequency-domain samples and second zero values to the tones of the system bandwidth;
performing an inverse discrete Fourier transform (IDFT) on the mapped second series of frequency-domain samples and the mapped second zero values to generate second time domain samples of a second OFDM symbol; and
transmitting the second OFDM symbol as another single-carrier waveform in a second period, wherein the first period and the second period are consecutive periods.

5. A method for wireless communications, comprising:
receiving a first orthogonal frequency division multiplexing (OFDM) symbol as a single-carrier waveform in a first period in a system bandwidth;
performing a discrete Fourier transform (DFT) on first time domain samples of the first OFDM symbol to generate first frequency-domain samples;
performing an inverse discrete Fourier transform (IDFT) on the first frequency-domain samples to generate a first series of data samples concatenated with first samples of a known sequence, wherein the known sequence is not all zeroes, and wherein all of the data samples of the first sequence are before all of the samples of the known sequence in the first series; and
processing the first series of data samples to determine data.

6. The method of claim 5, wherein the IDFT has a size equal to a number of non-zero samples in the first frequency-domain samples.

7. The method of claim 5, wherein the first frequency-domain samples are mapped to consecutive tones of the system bandwidth.

8. The method of claim 5, further comprising:
receiving a second OFDM symbol as another single-carrier waveform in a second period, wherein the first period and the second period are consecutive periods;
performing a discrete Fourier transform (DFT) on second time-domain samples of the second OFDM symbol to generate second frequency-domain samples;
performing an inverse discrete Fourier transform (IDFT) on the second frequency-domain samples to generate a second series of data samples and second samples of the known sequence; and
comparing the first samples of the known sequence with the second samples of the known sequence to track phase of a transmitter transmitting the first OFDM symbol and the second OFDM symbol.

9. An apparatus for wireless communications, comprising:
a processor configured to:
concatenate a first sequence of data samples with samples of a known sequence to generate a first series of samples, wherein the known sequence is not all zeroes, and wherein all of the data samples of the first sequence are before all of the samples of the known sequence in the first series;
perform a discrete Fourier transform (DFT) on the first series of samples to generate a first series of frequency-domain samples;
map the first series of frequency-domain samples and first zero values to tones of a system bandwidth;
perform an inverse discrete Fourier transform (IDFT) on the mapped first series of frequency-domain samples and the mapped first zero values to generate first time domain samples of a first orthogonal frequency division multiplexing (OFDM) symbol; and
transmit the first OFDM symbol as a single-carrier waveform in a first period; and
a memory coupled with the processor.

10. The apparatus of claim 9, wherein the processor is configured to perform the DFT that has a size equal to a number of samples in the first series of samples.

11. The apparatus of claim 9, wherein the processor is configured to map the first series of frequency-domain samples and the first zero values to the tones of the system bandwidth by mapping the first series of frequency-domain samples to consecutive tones of the system bandwidth.

12. The apparatus of claim 9, wherein the processor is further configured to:
- concatenate a second sequence of data samples with samples of the known sequence to generate a second series of samples;
- perform a discrete Fourier transform (DFT) on the second series of samples to generate a second series of frequency-domain samples;
- map the second series of frequency-domain samples and second zero values to the tones of the system bandwidth;
- perform an inverse discrete Fourier transform (IDFT) on the mapped second series of frequency-domain samples and the mapped second zero values to generate second time domain samples of a second OFDM symbol; and
- transmit the second OFDM symbol as another single-carrier waveform in a second period, wherein the first period and the second period are consecutive periods.

13. An apparatus for wireless communications, comprising:
- a processor configured to:
  - receive a first orthogonal frequency division multiplexing (OFDM) symbol as a single-carrier waveform in a first period in a system bandwidth;
  - perform a discrete Fourier transform (DFT) on first time domain samples of the first OFDM symbol to generate first frequency-domain samples;
  - perform an inverse discrete Fourier transform (IDFT) on the first frequency-domain samples to generate a first series of data samples concatenated with first samples of a known sequence, wherein the known sequence is not all zeroes, and wherein all of the data samples of the first sequence are before all of the samples of the known sequence in the first series; and
  - process the first series of data samples to determine data; and
- a memory coupled with the processor.

14. The apparatus of claim 13, wherein the processor is configured to perform the IDFT that has a size equal to a number of non-zero samples in the first frequency-domain samples.

15. The apparatus of claim 13, wherein the processor is configured to perform the IDFT on the first frequency-domain samples that are mapped to consecutive tones of the system bandwidth.

16. The apparatus of claim 13, wherein the processor is further configured to:
- receive a second OFDM symbol as another single-carrier waveform in a second period, wherein the first period and the second period are consecutive periods;
- perform a discrete Fourier transform (DFT) on second time-domain samples of the second OFDM symbol to generate second frequency-domain samples;
- perform an inverse discrete Fourier transform (IDFT) on the second frequency-domain samples to generate a second series of data samples and second samples of the known sequence; and
- compare the first samples of the known sequence with the second samples of the known sequence to track phase of a transmitter transmitting the first OFDM symbol and the second OFDM symbol.

* * * * *